US012627494B2

(12) United States Patent
Walia et al.

(10) Patent No.: US 12,627,494 B2
(45) Date of Patent: May 12, 2026

(54) COMMUNICATIONS SYSTEM WITH LOW-BANDWIDTH MESSAGING

(71) Applicant: Apple Inc., Cupertino, CA (US)

(72) Inventors: Abhishek Walia, Santa Clara, CA (US); Gregory R Nelson, Los Altos, CA (US); Samy Touati, Pleasanton, CA (US); Nelson M LeDuc, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/898,173

(22) Filed: Sep. 26, 2024

(65) Prior Publication Data

US 2025/0379731 A1 Dec. 11, 2025

Related U.S. Application Data

(60) Provisional application No. 63/657,574, filed on Jun. 7, 2024.

(51) Int. Cl.
H04L 9/14 (2006.01)
H04L 9/08 (2006.01)
(Continued)

(52) U.S. Cl.
CPC .............. H04L 9/14 (2013.01); H04L 9/0872 (2013.01); H04L 63/0428 (2013.01);
(Continued)

(58) Field of Classification Search
CPC . H04L 9/14; H04L 9/08; H04L 9/0894; H04L 9/0816; H04L 9/0872;
(Continued)

(56) References Cited

U.S. PATENT DOCUMENTS 11,464,069 B2 10/2022 Mbonye et al.
11,848,747 B1 12/2023 Ettus et al.
(Continued)

FOREIGN PATENT DOCUMENTS

EP 4170929 A1 4/2023
WO 2021154466 A1 8/2021

OTHER PUBLICATIONS

U.S. Appl. No. 18/455,155, filed Aug. 24, 2023.
(Continued)

*Primary Examiner* — Shaqueal D Wade-Wright
(74) *Attorney, Agent, or Firm* — Treyz Law Group, P.C.; Michael H. Lyons

(57) ABSTRACT

A communications system may include a satellite constellation and a terrestrial network that convey text messages between first and second user equipment (UE) devices. The terrestrial network may include a core network, an interworking function (IWF) server, and carrier networks. The IWF server may distribute keys and the first UE device may transmit provisioning data to the core network while the first UE device is on-grid. When the first UE device goes off-grid, the first UE device may transmit an escrow key to the core network for use in decrypting a device public key from the provisioning data. The core network may transmit the device public key and other information to the IWF for use in routing messages via the NTN. The core network may use the handles to enforce an allow list that filters traffic to the first UE device over the NTN.

20 Claims, 13 Drawing Sheets

(51) Int. Cl.

| | |
|---|---|
| *H04L 9/40* | (2022.01) |
| *H04W 12/03* | (2021.01) |
| *H04W 12/0471* | (2021.01) |
| *H04W 12/037* | (2021.01) |

(52) U.S. Cl.
CPC ....... *H04W 12/03* (2021.01); *H04W 12/0471* (2021.01); *H04L 9/0894* (2013.01); *H04L 63/0485* (2013.01); *H04W 12/037* (2021.01)

(58) Field of Classification Search
CPC ... H04L 9/0891; H04L 63/04; H04L 63/0428; H04L 63/0478; H04L 63/0485; H04L 63/065; H04W 12/03; H04W 12/033; H04W 12/037; H04W 12/04; H04W 12/041; H04W 12/0471

See application file for complete search history.

(56) References Cited

U.S. PATENT DOCUMENTS

| | | | |
|---|---|---|---|
| 12,081,311 B1 | 9/2024 | Talakoub et al. | |
| 12,167,321 B1 * | 12/2024 | Kim | H04W 56/001 |
| 2019/0260632 A1 * | 8/2019 | Mishra | H04L 43/20 |
| 2020/0145829 A1 * | 5/2020 | Rule | H04L 63/20 |
| 2021/0297853 A1 * | 9/2021 | Lee | H04W 60/04 |
| 2022/0399996 A1 * | 12/2022 | Desvignes | H04L 9/0825 |
| 2024/0146399 A1 | 5/2024 | Bhattarai et al. | |

OTHER PUBLICATIONS

U.S. Appl. No. 18/455,880, filed Aug. 25, 2023.
3GPP, "3rd Generation Partnership Project; Technical Specification Group Services and System Aspects; Study on integration of satellite components in the 5G architecture; Phase 3 (Release 19)", Technical Report, Apr. 29, 2024, pp. 1-262, 3GPP Organizational Partners, France.

* cited by examiner

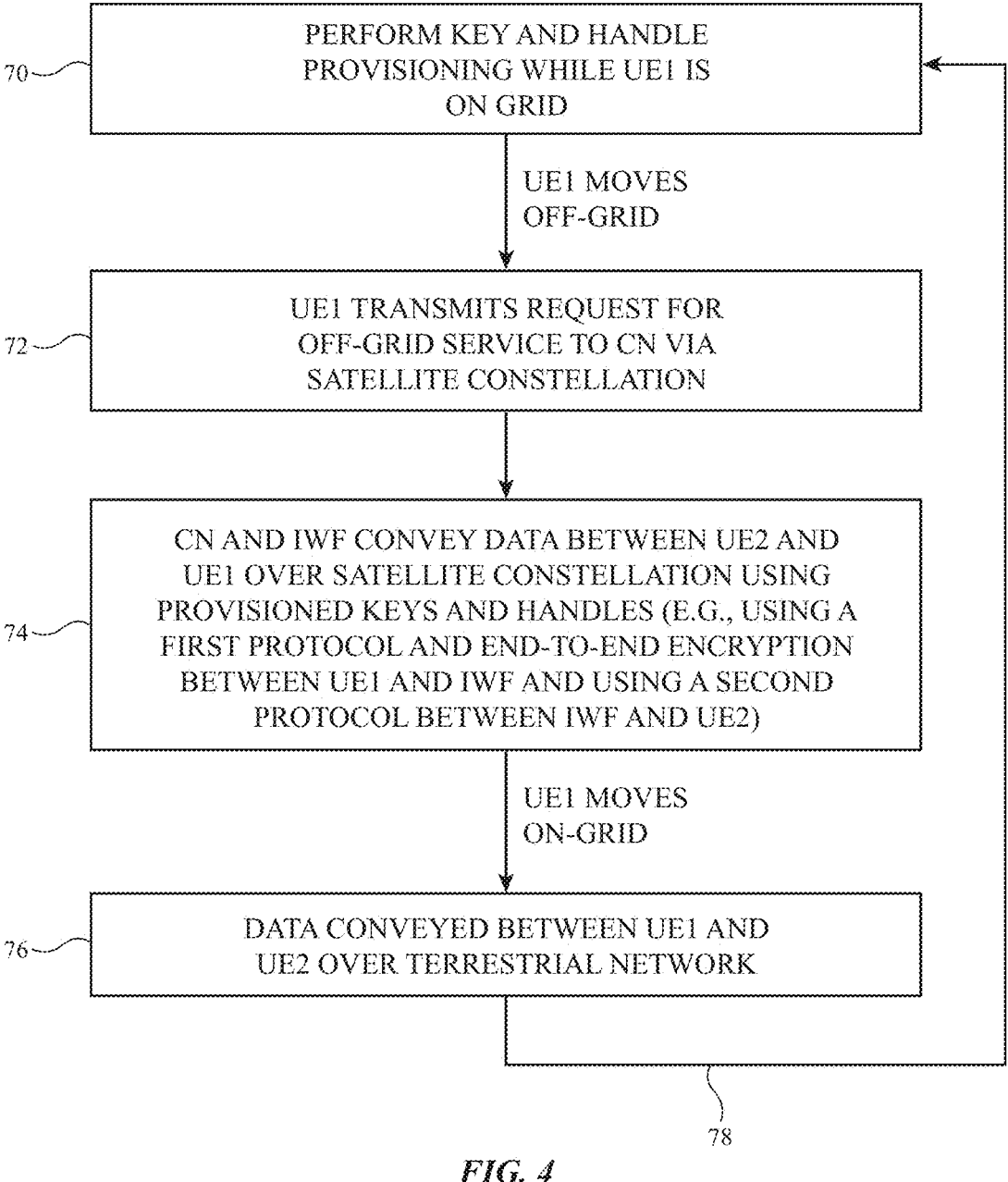

70 — PERFORM KEY AND HANDLE PROVISIONING WHILE UE1 IS ON GRID

UE1 MOVES OFF-GRID

72 — UE1 TRANSMITS REQUEST FOR OFF-GRID SERVICE TO CN VIA SATELLITE CONSTELLATION

74 — CN AND IWF CONVEY DATA BETWEEN UE2 AND UE1 OVER SATELLITE CONSTELLATION USING PROVISIONED KEYS AND HANDLES (E.G., USING A FIRST PROTOCOL AND END-TO-END ENCRYPTION BETWEEN UE1 AND IWF AND USING A SECOND PROTOCOL BETWEEN IWF AND UE2)

UE1 MOVES ON-GRID

76 — DATA CONVEYED BETWEEN UE1 AND UE2 OVER TERRESTRIAL NETWORK

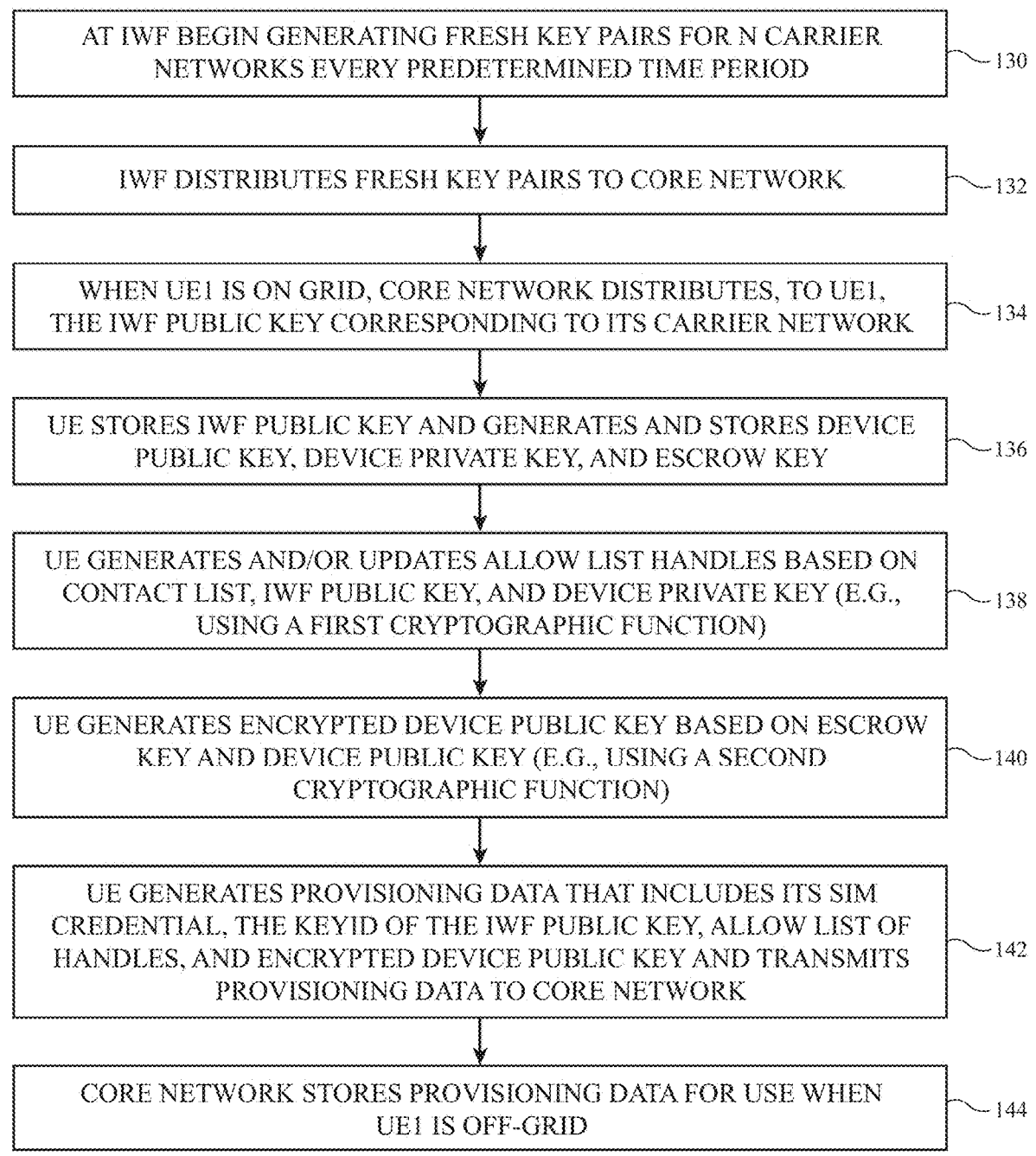

AT IWF BEGIN GENERATING FRESH KEY PAIRS FOR N CARRIER NETWORKS EVERY PREDETERMINED TIME PERIOD ~130

IWF DISTRIBUTES FRESH KEY PAIRS TO CORE NETWORK ~132

WHEN UE1 IS ON GRID, CORE NETWORK DISTRIBUTES, TO UE1, THE IWF PUBLIC KEY CORRESPONDING TO ITS CARRIER NETWORK ~134

UE STORES IWF PUBLIC KEY AND GENERATES AND STORES DEVICE PUBLIC KEY, DEVICE PRIVATE KEY, AND ESCROW KEY ~136

UE GENERATES AND/OR UPDATES ALLOW LIST HANDLES BASED ON CONTACT LIST, IWF PUBLIC KEY, AND DEVICE PRIVATE KEY (E.G., USING A FIRST CRYPTOGRAPHIC FUNCTION) ~138

UE GENERATES ENCRYPTED DEVICE PUBLIC KEY BASED ON ESCROW KEY AND DEVICE PUBLIC KEY (E.G., USING A SECOND CRYPTOGRAPHIC FUNCTION) ~140

UE GENERATES PROVISIONING DATA THAT INCLUDES ITS SIM CREDENTIAL, THE KEYID OF THE IWF PUBLIC KEY, ALLOW LIST OF HANDLES, AND ENCRYPTED DEVICE PUBLIC KEY AND TRANSMITS PROVISIONING DATA TO CORE NETWORK ~142

CORE NETWORK STORES PROVISIONING DATA FOR USE WHEN UE1 IS OFF-GRID ~144

*FIG. 9*

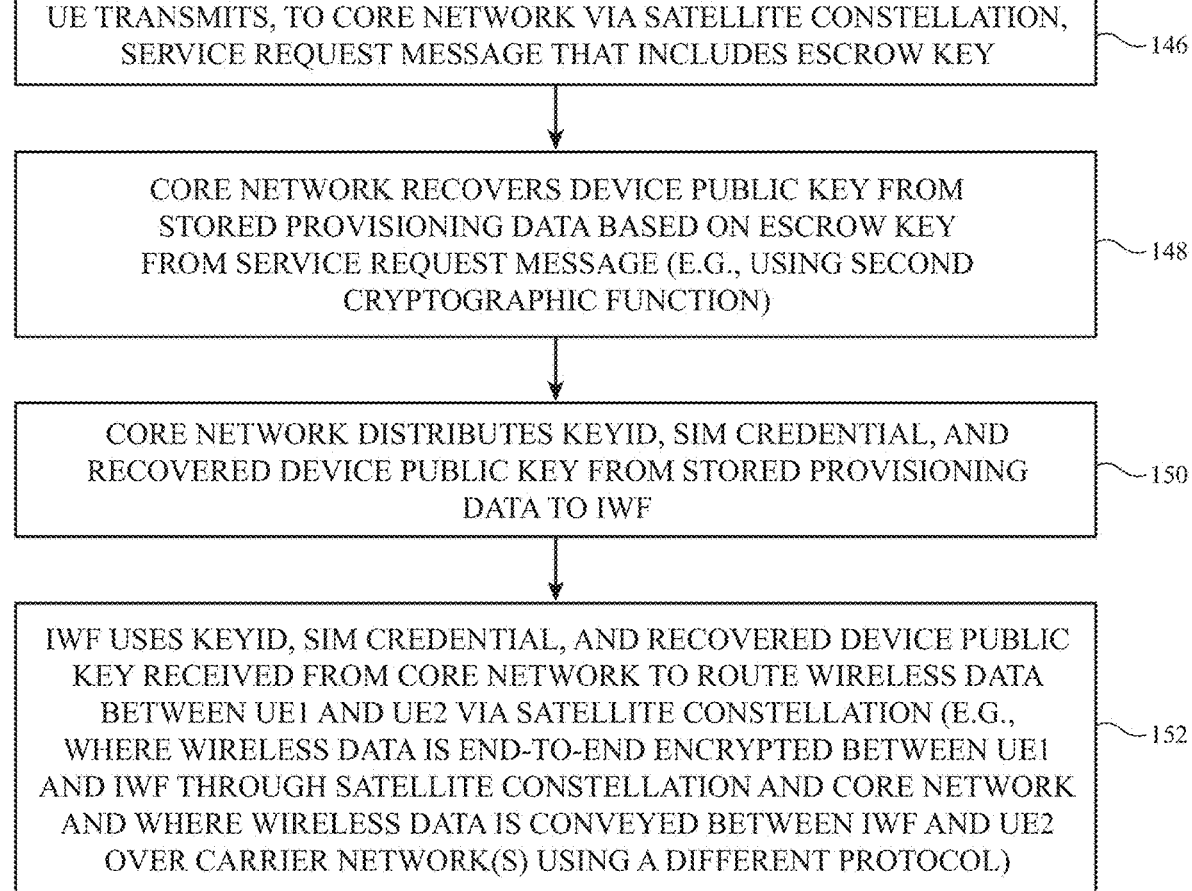

UE TRANSMITS, TO CORE NETWORK VIA SATELLITE CONSTELLATION, SERVICE REQUEST MESSAGE THAT INCLUDES ESCROW KEY ～146

CORE NETWORK RECOVERS DEVICE PUBLIC KEY FROM STORED PROVISIONING DATA BASED ON ESCROW KEY FROM SERVICE REQUEST MESSAGE (E.G., USING SECOND CRYPTOGRAPHIC FUNCTION) ～148

CORE NETWORK DISTRIBUTES KEYID, SIM CREDENTIAL, AND RECOVERED DEVICE PUBLIC KEY FROM STORED PROVISIONING DATA TO IWF ～150

IWF USES KEYID, SIM CREDENTIAL, AND RECOVERED DEVICE PUBLIC KEY RECEIVED FROM CORE NETWORK TO ROUTE WIRELESS DATA BETWEEN UE1 AND UE2 VIA SATELLITE CONSTELLATION (E.G., WHERE WIRELESS DATA IS END-TO-END ENCRYPTED BETWEEN UE1 AND IWF THROUGH SATELLITE CONSTELLATION AND CORE NETWORK AND WHERE WIRELESS DATA IS CONVEYED BETWEEN IWF AND UE2 OVER CARRIER NETWORK(S) USING A DIFFERENT PROTOCOL) ～152

*FIG. 10*

COMMUNICATIONS SYSTEM WITH LOW-BANDWIDTH MESSAGING

This application claims the benefit of U.S. Provisional Patent Application No. 63/657,574 filed Jun. 7, 2024, which is hereby incorporated by reference herein in its entirety.

FIELD

This relates generally to wireless communications, including wireless communications between user equipment devices.

BACKGROUND

Communications systems are used to convey data between terminals such as user equipment (UE) devices. A communications system can include a wireless network that wirelessly conveys data between UE devices.

In practice, some wireless networks can exhibit limited speed and/or bandwidth in conveying data between UE devices. Care should be taken to ensure that a UE device does not need to wait an excessive amount of time to successfully transmit or receive data and to ensure that the wireless network conveys the data while maintaining sufficient levels of security and user privacy.

SUMMARY

A communications system may include a non-terrestrial network (NTN) and a terrestrial network that convey wireless data such as text messages between at least first and second user equipment (UE) devices. The terrestrial network may include a core network, an inter-working function (IWF) server, and a set of carrier networks. The NTN may include a constellation of communications satellites. The first UE device may move between being on-grid and connected to the terrestrial network and being off-grid and disconnected from the terrestrial network.

The IWF server may distribute IWF keys for each carrier network to the core network. The core network may distribute a public key from the IWF keys to the first UE device while the first UE device is on-grid. The first UE device may transmit provisioning data to the core network while the first UE device is on-grid. The provisioning data may include an allow list of UE handles, a subscriber identity module (SIM) credential of the first UE device, a key identifier associated with the public key distributed to the first UE device, and an encrypted device public key generated by the first UE device using an escrow key.

When the first UE device goes off grid, the first UE device may transmit the escrow key to the core network. The core network may decrypt the encrypted device public key from the provisioning data using the escrow key. The core network may transmit the SIM credential, the key identifier, and the decrypted device public key to the IWF. The IWF may use this information to route messages between the first UE device and the second UE device via the core network, the NTN, and the carrier network. The core network may use the handles to enforce an allow list policy to filter traffic to the first UE device over the NTN while hiding the identity of the second UE device from the core network. The IWF may allow the first UE device to appear to the carrier network and the second UE device as if the UE device is on-grid and connected to the terrestrial network.

BRIEF DESCRIPTION OF THE DRAWINGS

FIG. 4 is a flow chart of illustrative operations involved in conveying data between first and second user equipment devices using a communications system that includes a terrestrial network and a non-terrestrial network in accordance with some embodiments.

FIG. 9 is a flow chart of illustrative operations involved in provisioning cryptographic keys and user equipment handles while a user equipment device is on-grid in accordance with some embodiments.

FIG. 10 is a flow chart of illustrative operations involved in conveying wireless data between a first user equipment device and a second user equipment device using an IWF server and a core network while the first user equipment device is off-grid in accordance with some embodiments.

DETAILED DESCRIPTION

Figure 1:
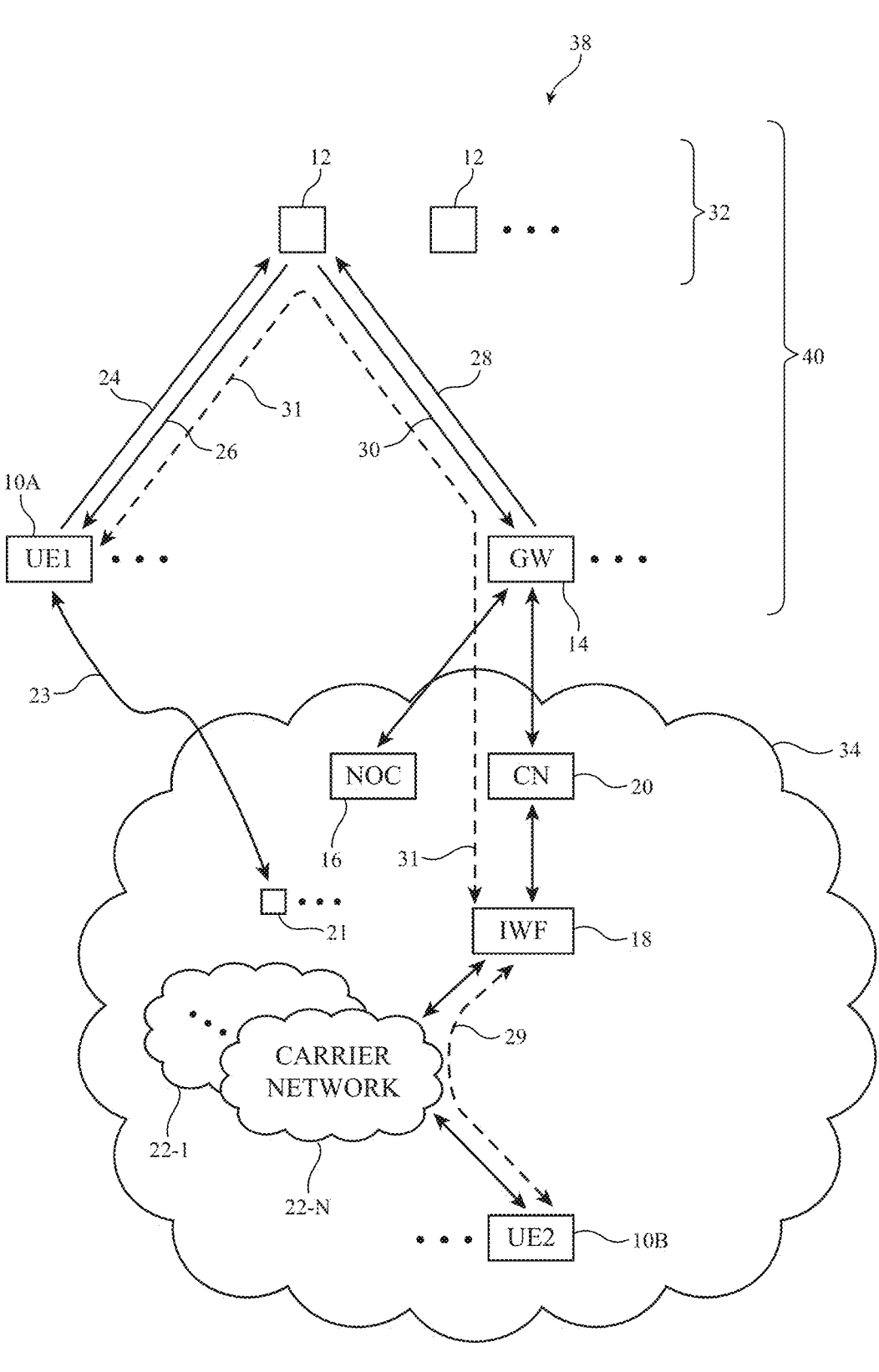
FIG. 1 is a diagram of an illustrative communications system including user equipment devices that communicate via a terrestrial network and a non-terrestrial network in accordance with some embodiments.

FIG. 1 is a diagram of an illustrative communications system 38. Communications system 38 (sometimes referred to herein as communications network 38, network 38, system 38, satellite communications system 38, or satellite communications network 38) may include a first network having a first maximum bandwidth such as terrestrial network 34. Communications system 38 may also include a second network having a second maximum bandwidth less than the first maximum bandwidth such as non-terrestrial network (NTN) 40.

Communications system 38 may include a set of one or more user equipment (UE) devices 10 on Earth, such as at least a first UE device 10A (sometimes denoted herein as UE1) and a second UE device 10B (sometimes denoted herein as UE2). Only two UE devices are illustrated in FIG. 1 for the sake of simplicity and clarity. In general, communications system 38 may include any desired number of UE devices (e.g., hundreds, thousands, millions, billions, etc.).

The nodes of terrestrial network 34 are located on Earth. NTN 40 is a space-based network that includes nodes on Earth as well as nodes in space (e.g., in orbit around Earth). NTN 40 may include a ground-based (terrestrial) gateway system that includes one or more gateways 14. NTN 40 may also include a set of one or more UE devices 10 (e.g., UE devices configured to communicate via NTN 40) such as UE device 10A. Terrestrial network 34 may include a set of one or more UE devices 10 such as UE device 10B. UE device 10A may form part of terrestrial network 34 when UE device 10A communicates with terrestrial-based wireless communications equipment 21 (sometimes also referred to herein as terrestrial-based communications equipment 21 or terrestrial communications equipment 21).

Terrestrial network 34 may include a set of N different worldwide cellular telephone carrier networks such as carrier networks 22 (e.g., carrier network 22-1, carrier network 22-N, etc.). Carrier networks 22 are sometimes also referred to herein as cellular networks 22, cellular carrier networks 22, or cellular telephone carrier networks 22. Each carrier network 22 may be associated with, operated by, owned by, controlled by, and/or managed by a corresponding cellular telephone network carrier or service provider (sometimes also referred to as a mobile network operator (MNO)). Each carrier network 22 may include a respective network of cellular base stations. Each cellular base station may provide cellular telephone coverage within a respective geographic region or area, sometimes also referred to as a cell. The cellular base stations of carrier networks 22 may convey radio-frequency signals with UE devices 10 in one or more cellular telephone communications bands, using one or more cellular telephone radio access technologies (RATs), and using one or more cellular telephone communications protocols. The radio-frequency signals may convey voice signals, cellular data, and Short Messaging Service (SMS) text messages. Each UE device 10 of a corresponding carrier network 22 (e.g., UE devices 10 registered with or subscribed to the carrier network) may include a subscriber identity module (SIM) (e.g., a SIM card) associated with the carrier network and/or the MNO of the carrier network.

Terrestrial-based wireless communications equipment 21 of terrestrial network 34 may include, for example, one or more wireless base stations of carrier networks 22, one or more wireless access points (e.g., for implementing a wireless local area network (WLAN)), and/or other UE devices 10 (e.g., for implementing a device-to-device (D2D) network, a wireless personal area network (WPAN), etc.). UE device 10A may convey radio-frequency signals with terrestrial-based wireless communications equipment 21 over a corresponding terrestrial network wireless communication link 23 when available. UE device 10A may convey wireless data (e.g., text messages, voice data, other cellular data, etc.) over terrestrial network wireless communication link 23 using radio-frequency signals conveyed between UE device 10A and terrestrial-based wireless communications equipment 21. Terrestrial network wireless communication link

23 may be supported using cellular telephone signals, WLAN signals, WPAN signals, D2D signals, etc.

A UE device 10 is referred to herein as being "online" or "on-grid" when the UE device is within range of terrestrial-based wireless communications equipment 21 and when terrestrial-based wireless communications equipment 21 provides access (e.g., communications resources) to terrestrial network 34 for the UE device. When the UE device is on-grid, the UE device may communicate with other network nodes or terminals of terrestrial network 34 via terrestrial network wireless communications link 23.

Conversely, a UE device 10 is referred to herein as being "offline" or "off-grid" when the UE device is out of range of any terrestrial-based wireless communications equipment 21 (e.g., such that a wireless performance metric characterizing communications between the UE device and the terrestrial-based wireless communications equipment is less than a threshold level) or when the UE device is in range of terrestrial-based wireless communications equipment 21 but terrestrial-based wireless communications equipment 21 does not provide the UE device with access to terrestrial network 34. In-range terrestrial-based wireless communications equipment 21 may not provide access to terrestrial network 34 for the UE device (rendering the UE device off-grid) when, for example, the in-range terrestrial-based wireless communications equipment 21 is disabled due to a power outage, natural disaster, traffic surge, or emergency, when the in-range terrestrial-based wireless communications equipment 21 denies access to terrestrial network 34 for the UE device, when the in-range terrestrial-based wireless communications equipment 21 is overloaded with other communications traffic, etc. The UE device is sometimes referred to herein as being connected to terrestrial network 34 (e.g., via terrestrial network wireless communications link 23) while on-grid. The UE device is sometimes referred to herein as being disconnected or unconnected from terrestrial network 34 while off-grid.

If desired, UE devices 10 may include separate antennas for handling communications over the satellite-to-user equipment link and one or more terrestrial network wireless communication links 23 or UE devices 10 may include a single antenna that handles both the satellite-to-user equipment link and the terrestrial network wireless communications links. The terrestrial network wireless communications links may be, for example, cellular telephone links (e.g., links maintained using a cellular telephone communications protocol such as a 4G Long Term Evolution (LTE) protocol, a 3G protocol, a 3GPP Fifth Generation (5G) New Radio (NR) protocol, a 3GPP Sixth Generation (6G) protocol, etc.), wireless local area network links (e.g., Wi-Fi® links), wireless personal area network links (e.g., Bluetooth links), D2D links, etc.

NTN 40 may include a constellation 32 of one or more communications satellites 12 in space (e.g., in orbit around Earth). Constellation 32 conveys signals between UE devices 10 and gateways 14 through space. Constellation 32 is sometimes also referred to herein as satellite constellation 32. NTN 40 may include any desired number of gateways 14, any desired number of satellites 12, and any desired number of UE devices 10. Only a single gateway (GW) 14, two satellites 12, and a single UE device 10A are shown in NTN 40 of FIG. 1 for the sake of clarity. Each gateway 14 in NTN 40 may be located at a different respective geographic location on Earth (e.g., across different regions, cities, counties, prefectures, districts, municipalities, land masses, areas, localities, states, provinces, countries, continents, etc.).

Terrestrial network 34 may be communicatively coupled to gateway 14. Gateway 14 is sometimes also referred to herein as ground station (GS) 14 or satellite network ground station 14. Gateway 14 may include one or more antennas (e.g., electronically and/or mechanically adjustable antennas), modems, transceivers, amplifiers, beam forming circuitry, control circuitry (e.g., one or more processors, storage circuitry, etc.) and other components that are used to convey communications data. The components of gateway 14 may be disposed within a building, vehicle, housing, enclosure, etc. Gateways 14 are stationary on Earth whereas UE devices 10 are mobile and move around Earth over time. Gateways 14 may convey communications data between terrestrial network 34 and UE devices 10 via constellation 32.

Terrestrial network 34 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). Terrestrial network 34 may include one or more relay networks, mesh networks, local area networks (LANs), wireless local area networks (WLANs), ring networks (e.g., optical rings), cloud networks, virtual/logical networks, the Internet, virtual private networks (VPNs), combinations of these, and/or any other desired network nodes coupled together using any desired network topologies (e.g., on Earth). The network nodes, terminals, and/or end hosts may include network switches, network routers, optical add-drop multiplexers, other multiplexers, repeaters, modems, servers, network cards, wireless access points, wireless base stations, UE devices, and/or any other desired network components. The network nodes in terrestrial network 34 may include physical components such as electronic devices, servers, computers, user equipment, etc., and/or may include virtual components that are logically defined in software and that are distributed across (over) two or more underlying physical devices (e.g., in a cloud network configuration).

Communications system 38 may include one or more satellite network operations centers such as network operations center (NOC) 16. NOC 16 may control the operation of gateways 14 in communicating with constellation 32. NOC 16 may also control the operation of the satellites 12 in constellation 32. For example, NOC 16 may convey control commands via gateways 14 that control positioning operations (e.g., orbit adjustments), sensing operations (e.g., thermal information gathered using one or more thermal sensors), and/or any other desired operations performed in space by satellites 12. NOC 16, gateways 14, and satellite constellation 32 may be operated or managed by a corresponding satellite constellation operator that is a different entity than the network carriers (MNOs) of carrier networks 22.

Communications system 38 may also include a satellite communications (satcom) network service provider (e.g., a satcom network carrier or operator) for controlling wireless communications between UE devices 10 and terrestrial network 34 via constellation 32. The satcom network service provider may be a different entity than the satellite constellation operator that controls/operates NOC 16, gateways 14, and constellation 32 or, if desired, may be the same entity as the satellite constellation operator. The satcom network service provider is a different entity than the network carriers (MNOs) of carrier networks 22. The satcom network service provider may be, for example, the same entity that designs, manufactures, distributes, and/or assembles a subset of the UE devices 10 in communications system 38 and/or the operating system of the subset of UE devices 10.

One or more gateways 14 may control the operations of constellation 32 over corresponding radio-frequency communications links. Constellation 32 may include any desired number of satellites 12 (e.g., two satellites, four satellites, ten satellites, dozens of satellites, hundreds of satellites, thousands of satellites, etc.), two of which are shown in FIG. 1. If desired, two or more of the satellites 12 in constellation 32 may convey radio-frequency signals between each other using satellite-to-satellite (e.g., relay) links.

Constellation 32 may include a set of non-geostationary orbit (NGSO) satellites 12 (e.g., satellites in non-geostationary orbits) and, if desired, may include a set of geostationary orbit (GSO) satellites 12 (e.g., satellites in geostationary/geosynchronous orbits, sometimes referred to as geosynchronous satellites or GEO satellites). NGSO satellites 12 move relative to the surface of Earth over time (e.g., at non-zero velocities relative to the surface of Earth). GSO satellites 12 do not move relative to the surface of Earth (e.g., may orbit around Earth at a velocity that matches the rotation of Earth given the altitude of the satellites).

GSO satellites 12 in constellation 32 may, for example, orbit Earth at orbital altitudes of greater than around 30,000 km. NGSO satellites 12 in constellation 32 may include low earth orbit (LEO) satellites at orbital altitudes of less than around 8,000 km (e.g., satellites in low earth orbits, inclined low earth orbits, low earth circular orbits, etc.), medium earth orbit (MEO) satellites at orbital altitudes between around 8,000 km and 30,000 km (e.g., satellite in medium earth orbits), sun synchronous satellites (e.g., satellites in sun synchronous orbits), satellites in tundra orbits, satellites in Molniya orbits, satellites in polar orbits, and/or satellites in any other desired non-geosynchronous orbits around Earth. If desired, constellation 32 may include multiple sets of satellites each in a different type of orbit and/or each at different orbital altitudes. The satellites 12 of constellation 32 may be distributed in any desired number of orbital planes (e.g., having respective inclinations). In general, constellation 32 may include satellites 12 in any desired combination of orbits or orbit types.

The satellites 12 in constellation 32 may communicate with one or more UE devices 10 on Earth (e.g., UE device 10A) using one or more radio-frequency communications links (e.g., satellite-to-user equipment links). Satellites 12 may also communicate with gateways 14 on Earth using radio-frequency communications links (e.g., satellite-to-gateway links). Radio-frequency signals may be conveyed between UE devices 10 and satellites 12 and between satellites 12 and gateways 14 in IEEE bands such as the IEEE C band (4-8 GHZ), S band (2-4 GHz), L band (1-2 GHZ), X band (8-12 GHz), W band (75-110 GHz), V band (40-75 GHZ), K band (18-27 GHZ), $K_a$ band (26.5-40 GHZ), $K_u$ band (12-18 GHz), and/or any other desired satellite communications bands. If desired, different bands may be used for the satellite-to-user equipment links than for the satellite-to-gateway links.

Communications may be performed between gateways 14 and UE devices 10 such as UE device 10A in a forward (FWD) link direction and/or in a reverse (REV or RWD) link direction. In the forward link direction (sometimes referred to simply as the forward link), wireless data is conveyed from gateway 14 to UE device 10A via constellation 32. Wireless data conveyed over the forward link is sometimes referred to herein as forward link data. Forward link data may be organized into a set, series, or stream of forward link datagrams (e.g., having header fields that contain header information, payload fields that contain a forward link data payload, etc.).

Gateway 14 may, for example, transmit forward link data to one of the satellites 12 in constellation 32 (e.g., where forward link datagrams are modulated onto one or more carriers of radio-frequency signals 28). Satellite 12 may transmit (e.g., relay, in a bent-pipe configuration) the forward link data received from gateway 14 to UE device 10A (e.g., using radio-frequency signals 26). Radio-frequency signals 28 are conveyed in an uplink direction from gateway 14 to satellite 12 and are therefore sometimes also referred to herein as uplink (UL) signals 28, forward link UL signals 28, or forward link signals 28. Radio-frequency signals 26 are conveyed in a downlink direction from satellite 12 to UE device 10A and are therefore sometimes also referred to herein as downlink (DL) signals 26, forward link DL signals 26, or forward link signals 26.

In the reverse link direction (sometimes referred to simply as the reverse link), wireless data is conveyed from UE device 10A to gateway 14 via constellation 32. Wireless data conveyed over the reverse link is sometimes referred to herein as reverse link data. Reverse link data may be organized into a set, series, or stream of reverse link datagrams (e.g., having header fields that contain header information, payload fields that contain a reverse link data payload, etc.).

UE device 10A may, for example, transmit reverse link data to one of the satellites 12 in constellation 32 (e.g., where reverse link datagrams are modulated onto one or more carriers of radio-frequency signals 24). Satellite 12 may transmit (e.g., relay, in a bent-pipe configuration) the reverse link data received from UE device 10A to a corresponding gateway 14 using radio-frequency signals 30. Radio-frequency signals 24 are conveyed in an uplink direction from UE device 10A to satellite 12 and are therefore sometimes also referred to herein as uplink (UL) signals 24, reverse link UL signals 24, or reverse link signals 24. Radio-frequency signals 30 are conveyed in a downlink direction from satellite 12 to gateway 14 and are therefore sometimes also referred to herein as downlink (DL) signals 30, reverse link DL signals 30, or reverse link signals 30.

Terrestrial network 34 may include a core network such as core network (CN) 20. CN 20 may serve as a communications interface between UE devices 10 that communicate via constellation 32 (e.g., UE device 10A) and the rest of terrestrial network 34. CN 20 may be communicatively coupled to the gateways 14 of NTN 40. Gateway 14 may forward wireless data between constellation 32 and CN 20. CN 20 may forward the wireless data to other network nodes or terminals of terrestrial network 34.

The wireless data conveyed in DL signals 26 is sometimes also referred to herein as DL data, forward link DL data, or forward link data. UL signals 28 may also convey the forward link data (e.g., forward link data that is routed by satellite 12 to UE device 10A in DL signals 26). The wireless data conveyed in UL signals 24 is sometimes also referred to herein as UL data, reverse link UL data, or reverse link data. The reverse link data may be generated and transmitted by UE device 10A. DL signals 30 may also convey the reverse link data. Forward link data may be generated by any desired network nodes or terminals of terrestrial network 34.

Forward link data and the reverse link data may include text data such as email messages, text messages, web browser data, an emergency or SOS message, a location message identifying the location of UE device 10A, or other text-based data, audio data such as voice data (e.g., for a bi-directional satellite voice call) or other audio data (e.g., streaming satellite radio data), video data (e.g., for a bi-directional satellite video call or to stream video data transmitted by gateway 14 at UE device 10A), cloud network synchronization data, data generated or used by software applications running on UE device 10A (e.g., application data), data for use in a distributed processing network, and/or any other desired data. UE device 10A may only receive forward link data, may only transmit reverse link data, or may both transmit reverse link data and receive forward link data. Each satellite 12 may communicate with UE devices 10 located within its coverage area at any given time (e.g., UE devices 10 located within cells on Earth that overlap the signal beam(s) producible by the satellite).

The satcom network service provider for communications system 38 may own, operate, control, and/or manage CN 20. CN 20 may sometimes also be referred to herein as satcom network region 20, CN region 20, satcom controller 20, satcom network 20, or satcom service provider equipment 20. CN 20 may be implemented on one or more network nodes and/or terminals of network portion 18 (e.g., one or more servers or other end hosts). In some implementations, CN 20 may be formed from a cloud computing network distributed over multiple underlying physical network nodes and/or terminals distributed across one or more geographic regions. CN 20 may therefore sometimes also be referred to herein as a CN cloud region or satcom network cloud region.

CN 20 may control and coordinate wireless communications between terminals (e.g., end hosts) of terrestrial network 34 and UE device 10A via constellation 32. For example, gateway 14 may receive reverse link data from UE device 10A via constellation 32 and may forward the reverse link data to CN 20. CN 20 may perform any desired processing operations on the reverse link data. For example, CN 20 may identify destinations for the reverse link data and may forward the reverse link data to the identified destinations.

CN 20 may also receive forward link data for transmission to UE device 10A from one or more terminals or end hosts of terrestrial network 34. CN 20 may process the forward link data to schedule the forward link data for transmission to UE device 10A via constellation 32. CN 20 may schedule the forward link data for transmission to UE device 10A by generating a forward link traffic grant for UE device 10A. CN 20 may provide the forward link data and the forward link traffic grant to gateway 14. Gateway 14 may transmit the forward link data to UE device 10A via constellation 32 according to the forward link traffic grant (e.g., according to a forward link communications schedule that implements the forward link traffic grant). CN 20 may include, be coupled to, and/or be associated with one or more content delivery networks (CDNs) that provide content for delivery to UE device 10A.

UE device 10A may convey wireless data such as message data, voice call data, video call data, application data, etc., with another UE device such as UE device 10B. Implementations in which the wireless data includes text message data (e.g., short message service (SMS) data) are described herein as an example. The text message data as described herein may be replaced with any other desired data conveyed between UE device 10A and UE device 10B. While communications are described herein in connection with constellation 32 for the sake of illustration, NTN 40 as described herein may be replaced with any desired network (e.g., a terrestrial-based network) having lower bandwidth or capacity than terrestrial network 34 (e.g., where satellites 12 are replaced by terrestrial nodes on Earth).

When UE device 10A is on-grid, the high speed and bandwidth of terrestrial network 34 allows text message data to be seamlessly conveyed between UE device 10A and UE device 10B with maximal data rates and minimal latency. However, when UE device 10A moves off-grid, the text message data needs to pass through constellation 32, which greatly limits the bandwidth and data rate of the text message data (e.g., due to the extreme path lengths between UE device 10A and satellites 12 and between satellites 12 and gateway 14, the limited transmission resources of UE device 10A, the limited power and scheduling resources of satellites 12 in space, etc.).

The limited resources of constellation 32 can make it difficult for UE device 10A to successfully transmit and receive large amounts of data. UE device 10A may therefore prioritize reducing the size and amount of wireless data transmitted over constellation 32 when off-grid. In some implementations, the user of UE device 10A may also face a relatively high cost per unit of data in communicating via constellation 32 (e.g., pursuant to the user's subscription to satellite services with CN 20). Care should be taken to minimize the amount of time required for UE device 10A to successfully transmit text message data to UE device 10B and to successfully receive text message data from UE device 10B (e.g., to minimize the detriment to user experience imposed by communicating via constellation 32). Care should also be taken to ensure user privacy and to ensure that the text message data is sufficiently secure in propagating through the different systems and networks of communications system 38, which are operated or managed by different entities and which can be susceptible to data breaches or attacks by unauthorized parties (e.g., man-in-the-middle attackers, etc.).

With this in mind, when UE device 10A is on-grid, one or more carrier networks 22 may convey the text message data between UE device 10A and UE device 10B (e.g., directly or via CN 20) without passing the text message data through constellation 32. When UE device 10A moves off-grid, terrestrial-based wireless communications equipment 21 is no longer available to UE device 10A. Instead, UE device 10A may use NTN 40 to convey the text message data with UE device 10B.

To support data routing between UE device 10A and UE device 10B when UE device 10A is off-grid, while helping to shield CN 20 from sensitive user information, terrestrial network 34 may include an inter-working function (IWF) server 18. While referred to herein as a server for the sake of simplicity, IWF server 18 may be distributed across one or more end hosts, terminals, nodes, servers, or devices in terrestrial network 34 (e.g., IWF server 18 may be logically or virtually defined over any desired number of underlying physical devices). IWF server 18 is sometimes also referred to herein as IWF 18, carrier interface server(s) 18, carrier interface 18, interface server(s) 18, proxy server(s) 18, IWF network 18, IWF region 18, IWF cloud 18, or server(s) 18. IWF 18 may be managed, controlled, operated, and/or owned by a neutral third party entity or arbitrator that is different from (e.g., that is unaffiliated with) both the satcom network service provider of CN 20 and the N MNOs of carrier networks 22.

IWF 18 may serve as a communications interface between CN 20 and carrier networks 22 during the routing of wireless data between UE device 10B and UE device 10A while UE device 10A is off-grid. CN 20 and IWF 18 may help to filter messaging to UE device 10A (e.g., to help preserve bandwidth via constellation 32). IWF 18 may convert wireless data between a first format used by CN 20 to convey wireless data with UE device 10A and a second format used by carrier networks 22 to convey wireless data with UE device 10B. As one example, carrier networks 22 may convey text message data between IWF 18 and UE device 10B as SMS data (e.g., organized and transmitted according to an SMS protocol) whereas CN 20 conveys text message data with UE device 10B (e.g., via constellation 32) as non-SMS data transmitted and organized according to a different, non-SMS messaging protocol. I IWF 18 may also help to obfuscate identifying information about UE device 10A and CN 20 from carrier networks 22. IWF 18 may further help to obfuscate identifying information about UE device 10B and/or carrier networks 22 from CN 20 and/or UE device 10A. When UE device 10A is off-grid, IWF 18 may cause carrier networks 22 and UE device 10B to interact with UE device 10A (via IWF 18) as if UE device 10A were communicating via terrestrial network wireless communication link 23 rather than via NTN 40 (e.g., UE device 10A may appear indistinguishable to carrier networks 22 and UE device 10B from a UE device 10A communicating directly with a base station of a carrier network 22). Put differently, IWF 18 may effectively serve as a proxy for UE device 10A from the perspective of carrier networks 22 and UE device 10B while UE device 10A is off-grid.

Messages (e.g., text messages) that are transmitted by UE device 10A for receipt by UE device 10B are sometimes also referred to herein as mobile originated (MO) messages (e.g., containing MO message data payloads). Messages (e.g., text messages) that are transmitted by UE device 10B for receipt by UE device 10A are sometimes also referred to herein as mobile terminated (MT) messages (e.g., containing MT message data payloads).

While UE device 10A is off-grid, UE device 10A may transmit an MO text message (for receipt by UE device 10B) to constellation 32 using UL signals 24. UE device 10A may organize and transmit the MO text message according to a first format (e.g., a non-SMS text messaging format) and/or protocol (e.g., a non-SMS protocol) associated with CN 20. Constellation 32 relays the MO text message to gateway 14 using DL signals 30. Gateway 14 receives the MO text message and forwards the MO text message to CN 20. CN 20 forwards the MO text message to IWF 18.

To preserve message security, the MO text message transmitted by UE device 10A may be end-to-end encrypted between UE device 10A and IWF 18, as shown by arrow 31 (e.g., UE device 10A may encrypt the MO text message in a manner such that only IWF 18 is able to decrypt the MO text message). This prevents constellation 32, gateway 14, CN 20, and other unauthorized devices/attackers from being able to view the contents of the MO text message. To limit bandwidth of the MO text message (e.g., maximizing likelihood that constellation 32 will be able to successfully transmit the MO text message to gateway 14 given the communications constraints of satellites 12), UE device 10A may also compress the MO text message.

IWF 18 may decrypt and decompress the MO text message received from CN 20 (e.g., reversing the end-to-end encryption performed by UE device 10A). IWF 18 may convert the MO text message into a second format (e.g., an SMS format) and/or protocol (e.g., an SMS protocol) associated with the carrier network 22 of UE device 10B (e.g., the carrier network 22 to which UE device 10B is subscribed for cellular telephone service). IWF 18 may transmit the MO text message to UE device 10B via the corresponding carrier network 22, as shown by arrow 29, and optionally one or more intervening networks that are not illustrated in FIG. 1 for the sake of clarity. If desired, the MO text message may be end-to-end encrypted between IWF 18 and UE device 10B.

Conversely, while UE device 10A is off-grid, UE device 10B may transmit an MT text message (for receipt by UE device 10A) to IWF 18 via its carrier network 22. UE device 10B may organize and transmit the MT text message according to the second format and/or protocol. To preserve message security, the MT text message transmitted by UE device 10B may be end-to-end encrypted between IWF 18 and UE device 10A, as shown by arrow 31 (e.g., IWF 18 may encrypt the MT text message in a manner such that only UE device 10A is able to decrypt the MT text message). This prevents constellation 32, gateway 14, CN 20, and other unauthorized devices/attackers from being able to view the contents of the MT text message. To limit bandwidth of the MT text message (e.g., maximizing likelihood that constellation 32 will be able to successfully transmit the MT text message to UE device 10A given the communications constraints of satellites 12), IWF 18 may also compress the MT text message.

IWF 18 may convert the MT text message from the second format/protocol supported by carrier network 22 to the first format/protocol supported by CN 20. IWF 18 may transmit the compressed and encrypted MT text message to CN 20. CN 20 may transmit the compressed and encrypted MT text message to gateway 14. Gateway 14 may transmit the compressed and encrypted MT text message to constellation 32 (e.g., using UL signals 28), which routes the compressed and encrypted MT text message to UE device 10A (e.g., using DL signals 26). UE device 10A may decrypt and decompress the MT text message received from constellation 32 (e.g., reversing the end-to-end encryption performed by IWF 18). If desired, a software application on UE device 10A (e.g., a messaging application) may display the MT text message using a display of UE device 10A. Systems and methods for operating UE device 10A, CN 20, and IWF 18 to securely and efficiently route MT and MO text messages (or any other wireless data) between UE device 10A and UE device 10B are described in greater detail below.

A UE device 10 (e.g., UE device 10A or UE device 10B) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

Figure 2:
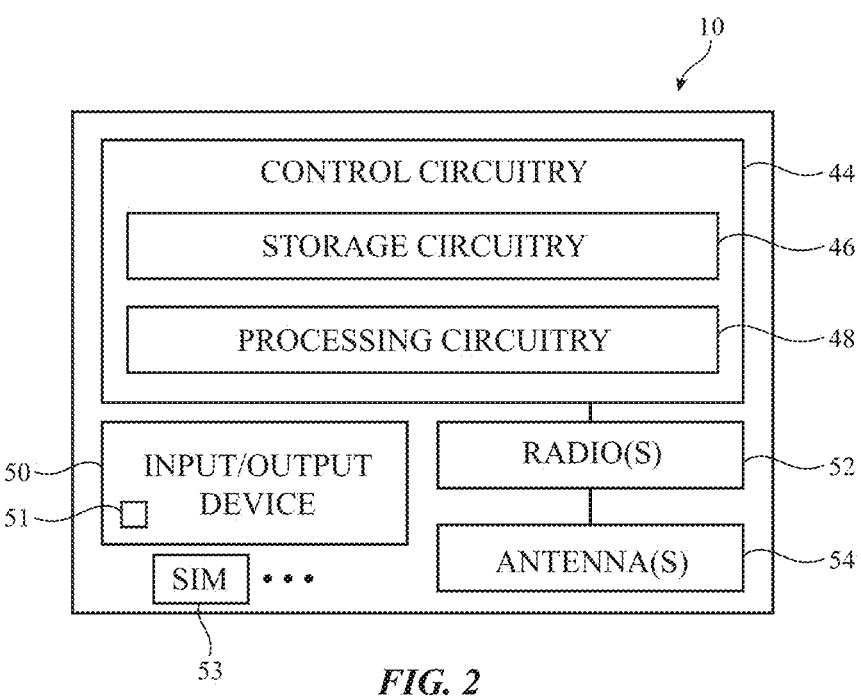
FIG. 2 is a schematic diagram of an illustrative user equipment device in accordance with some embodiments.

As shown in FIG. 2, UE device 10 (e.g., UE device 10A or UE device 10B of FIG. 1) may include components located on or within an electronic device housing such as housing 42. Housing 42, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 42 may be formed from dielectric or other low-conductivity material (e.g., glass, ceramic, plastic, sapphire, etc.). In other situations, housing 42 or at least some of the structures that make up housing 42 may be formed from metal elements.

UE device 10 may include control circuitry 44. Control circuitry 44 may include storage such as storage circuitry 46. Storage circuitry 46 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 46 may include storage that is integrated within UE device 10 and/or removable storage media.

Control circuitry 44 may include processing circuitry such as processing circuitry 48. Processing circuitry 48 may be used to control the operation of UE device 10. Processing circuitry 48 may include on one or more processors such as microprocessors, microcontrollers, digital signal processors, host processors, baseband processor integrated circuits, application specific integrated circuits, central processing units (CPUs), graphics processing units (GPUs), etc. Control circuitry 44 may be configured to perform operations in device 10 using hardware (e.g., dedicated hardware or circuitry), firmware, and/or software. Software code for performing operations on UE device 10 may be stored on storage circuitry 46 (e.g., storage circuitry 46 may include non-transitory (tangible) computer readable storage media that stores the software code). The software code may sometimes be referred to as program instructions, software, data, instructions, or code. Software code stored on storage circuitry 46 may be executed by processing circuitry 48.

Control circuitry 44 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 44 may be used in implementing communications protocols. Communications protocols that may be implemented using control circuitry 44 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), satellite communications protocols, and/or any other desired communications protocols. Each communications protocol may be associated with a corresponding radio access technology (RAT) that specifies the physical connection methodology used in implementing the protocol.

UE device 10 may store satellite information associated with one or more of the satellites 12 in satellite constellation 32 on storage circuitry 46. The satellite information, sometimes referred to herein as ephemeris data or ephemeris information, may include a satellite almanac identifying the orbital parameters/position (e.g., orbit information, elevation information, altitude information, inclination information, eccentricity information, orbital period information, trajectory information, right ascension information, declination information, ground track information, etc.) and/or the velocity of satellites 12 (e.g., relative to the surface of Earth). This information may include a two-line element (TLE), for example. The TLE may identify or include information about the orbital motion of one or more of the satellites 12 in satellite constellation 32 (e.g., satellite epoch, first and/or second derivatives of motion, drag terms, etc.). The TLE may be in the format of a text file having two lines or columns that include the set of elements forming the TLE, for example. Control circuitry 44 may use the ephemeris data to calculate, predict, or identify the location of satellites 12 at a given point in time.

UE device 10 may also include wireless circuitry to support wireless communications. The wireless circuitry may include one or more antennas 54 and one or more radios 52. Each radio 52 may include circuitry that operates on signals at baseband frequencies (e.g., baseband processing circuitry, one or more baseband processors, etc.), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 54. The components of each radio 52 may be mounted onto a respective substrate or integrated into a respective integrated circuit, chip, package, or system-on-chip (SOC). If desired, the components of multiple radios 52 may share a single substrate, integrated circuit, chip, package, or SOC.

Antenna(s) 54 may be formed using any desired antenna structures. For example, antenna(s) 54 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. If desired, one or more antennas 54 may include antenna resonating elements formed from conductive portions of housing 42 (e.g., peripheral conductive housing structures extending around a periphery of a display on UE device 10). Filter circuitry, switching circuitry, impedance matching circuitry, and/or other antenna tuning components may be adjusted to adjust the frequency response and wireless performance of antenna(s) 54 over time. If desired, multiple antennas 54 may be implemented as a phased array antenna (e.g., where each antenna forms a radiator or antenna element of the phased array antenna, which is sometimes also referred to as a phased antenna array). In these scenarios, the phased array antenna may convey radio-frequency signals within a signal beam. The phases and/or magnitudes of each radiator in the phased array antenna may be adjusted so the radio-frequency signals for each radiator constructively and destructively interfere to steer or orient the signal beam in a particular pointing direction (e.g., a direction of peak signal gain). The signal beam may be adjusted or steered over time.

Transceiver circuitry in radios 52 may convey radio-frequency signals using one or more antennas 54 (e.g., antenna(s) 54 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 54 may transmit the radio-frequency signals by radiating the radio-frequency signals into free space (or to free space through intervening device structures such as a dielectric cover layer). Antenna(s) 54 may additionally or alternatively receive the radio-frequency signals from free space (e.g., through intervening devices structures such as a dielectric cover layer). The transmission and reception of radio-frequency signals by antenna(s) 54 each involve the excitation or resonance of antenna currents on an antenna resonating element in the antenna by the radio-frequency signals within the frequency band(s) of operation of the antenna.

Each radio 52 may be coupled to one or more antennas 54 over one or more radio-frequency transmission lines. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. The radio-frequency transmission lines may be integrated into rigid and/or flexible printed circuit boards if desired. One or more of the radio-frequency lines may be shared between radios 52 if desired. Radio-frequency front end (RFFE) modules may be interposed on one or more of the radio-frequency transmission lines. The radio-frequency front end modules may include substrates, integrated circuits, chips, or packages that are separate from radios 52 and may include filter circuitry, switching circuitry, amplifier circuitry, impedance matching circuitry, radio-frequency coupler circuitry, and/or any other desired radio-frequency circuitry for operating on the radio-frequency signals conveyed over the radio-frequency transmission lines.

Radios 52 may use antenna(s) 54 to transmit and/or receive radio-frequency signals within different frequency bands at radio frequencies (sometimes referred to herein as communications bands or simply as a "bands"). The frequency bands handled by radios 52 may include satellite communications bands (e.g., the C band, S band, L band, X band, W band, V band, K band, $K_a$ band, $K_u$ band, etc.), wireless local area network (WLAN) frequency bands (e.g., Wi-Fi® (IEEE 802.11) or other WLAN communications bands) such as a 2.4 GHZ WLAN band (e.g., from 2400 to 2480 MHZ), a 5 GHz WLAN band (e.g., from 5180 to 5825 MHZ), a Wi-Fi® 6E band (e.g., from 5925-7125 MHZ), and/or other Wi-Fi® bands (e.g., from 1875-5160 MHz), wireless personal area network (WPAN) frequency bands such as the 2.4 GHZ Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHZ, 5G New Radio Frequency Range 2 (FR2) bands between 20 and 60 GHZ, 6G bands such as sub-THz bands between around 100 GHz and around 10 THz, etc.), other centimeter or millimeter wave frequency bands between 10-300 GHz, near-field communications (NFC) frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS)

band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Although control circuitry 44 is shown separately from radios 52 in the example of FIG. 2 for the sake of clarity, radios 52 may include processing circuitry that forms a part of processing circuitry 48 and/or storage circuitry that forms a part of storage circuitry 46 of control circuitry 44 (e.g., portions of control circuitry 44 may be implemented on radios 52). As an example, control circuitry 44 may include baseband circuitry or other control components that form a part of radios 52. The baseband circuitry may, for example, access a communication protocol stack on control circuitry 44 (e.g., storage circuitry 46) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

UE device 10 may include input-output devices 50. Input-output devices 50 may be used to allow data to be supplied to UE device 10 and to allow data to be provided from UE device 10 to external devices. Input-output devices 50 may include user interface devices, data port devices, and other input-output components. For example, input-output devices 50 may include touch sensors, displays such as display 51 (e.g., a touch-sensitive and/or force-sensitive display), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, orientation sensors, inertial measurement units, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 50 may be peripherals that are coupled to a main processing unit or other portion of device 10 via a wired or wireless link). UE device 10 may be owned and/or operated by an end user.

UE device 10 may include one or more SIMs such as SIM 53. SIM 53 may be associated with (e.g., owned or managed by) a corresponding carrier network 22 (FIG. 1). Radio 52 may use SIM 53 to access the associated carrier network 22 (e.g., to use carrier network 22 to route wireless data for the UE device). SIM 53 may include a SIM card, may be integrated into UE device 10 (e.g., may be an eSIM), or may be a removable SIM card. If desired, UE device 10 may include multiple SIMs for supporting multi-SIM communications with multiple different carrier networks 22. SIM 53 may identify a corresponding subscription to the wireless services of the corresponding carrier network 22 and may include, identify, or otherwise be associated with a corresponding SIM credential. The user who holds the subscription (e.g., the user of UE device 10) is sometimes referred to as a subscriber of the corresponding carrier network 22.

Each subscription to a carrier network 22 may have a corresponding Mobile Station International Subscriber Directory Number (MSISDN) (e.g., representing a globally unique telephone number associated with the subscription). SIM 53 may therefore include information identifying its corresponding MSISDN (e.g., the MSISDN of UE device 10). The corresponding carrier network 22 may include a subscription manager that stores and/or identifies all subscribers, subscriptions, and MSISDNs of the carrier network. The carrier network may use its subscription manager to verify the MSISDN of UE device 10 (e.g., using a challenge and response scheme) before providing UE device 10 with cellular telephone service (e.g., text message routing service). The MSISDN of SIM 53 may be unique to UE device 10 or may be shared by the same subscriber between multiple UE devices if desired.

A gateway 14 (FIG. 1) may include one or more radios that include one or more components similar to radio(s) 52, one or more antennas, one or more input/output devices, and control circuitry that includes one or more components similar to control circuitry 44. Unlike UE devices 10, gateway 14 is stationary and remains at a fixed location on Earth. Gateways 14 are not owned or operated by end users of UE devices 10. Gateway 14 may include one or more electronic devices. The electronic device(s) of a gateway 14 may be enclosed within a housing, enclosure, building, etc.

Figure 3:
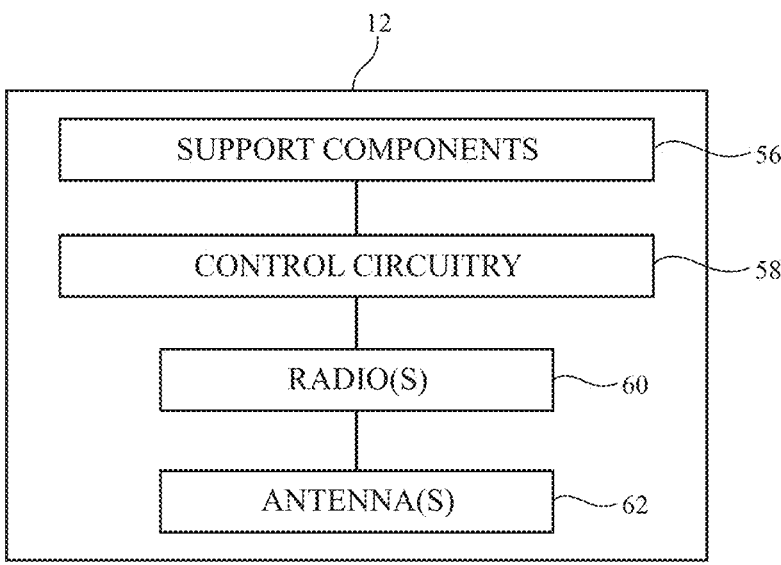
FIG. 3 is a schematic diagram of an illustrative communications satellite in accordance with some embodiments.

FIG. 3 is a diagram of an illustrative satellite 12 in communications system 38. As shown in FIG. 3, satellite 12 may include satellite support components 56. Support components 56 may include batteries, solar panels, sensors (e.g., accelerometers, gyroscopes, temperature sensors, light sensors, etc.), guidance systems, propulsion systems, and/or any other desired components associated with supporting satellite 12 in orbit above Earth.

Satellite 12 may include control circuitry 58. Control circuitry 58 may be used in controlling the operations of satellite 12. Control circuitry 58 may include processing circuitry such as processing circuitry 48 of FIG. 2 and may include storage circuitry such as storage circuitry 46 of FIG. 2. Control circuitry 58 may also control support components 56 to adjust the trajectory or position of satellite 12 in space.

Satellite 12 may include antennas 62 and one or more radios 60. Radios 60 may use antennas 62 to transmit DL signals 26 and DL signals 30 and to receive UL signals 24 and UL signals 28 of FIG. 1 (e.g., in one or more satellite communications bands). Radios 60 may include transceivers, modems, integrated circuit chips, application specific integrated circuits, filters, switches, up-converter circuitry, down-converter circuitry, analog-to-digital converter circuitry, digital-to-analog converter circuitry, amplifier circuitry (e.g., multiport amplifiers), beam steering circuitry, etc.

Antennas 62 may include any desired antenna structures (e.g., patch antenna structures, dipole antenna structures, monopole antenna structures, waveguide antenna structures, Yagi antenna structures, inverted-F antenna structures, cavity-backed antenna structures, combinations of these, etc.). In some implementations, antennas 62 may include one or more phased array antennas. Each phased array antenna may include beam forming circuitry having a phase and magnitude controller coupled to each antenna element in the phased array antenna. The phase and magnitude controllers may provide a desired phase and magnitude to the radio-frequency signals conveyed over the corresponding antenna element. The phases and magnitudes of each antenna element may be adjusted so that the radio-frequency signals conveyed by each of the antenna elements constructively and destructively interfere to produce a radio-frequency signal beam (e.g., a spot beam) in a desired pointing direction (e.g., an angular direction towards Earth at which the radio-frequency signal beam exhibits peak gain). Radio-frequency lenses may also be used to help guide the radio-frequency signal beam in a desired pointing direction. Each radio-frequency signal beam also exhibits a corresponding beam width. This allows each radio-frequency signal beam to cover a corresponding area on Earth (e.g., a region on Earth overlapping the radio-frequency signal beam such that the radio-frequency signal beam exhibits a power greater than a minimum threshold value within that region/cell). Satellite 12 may convey radio-frequency signals over multiple concurrently-active signal beams if desired. If desired, satellite 12 may offload some or all of its beam forming operations to gateway 14. The signal beams may sometimes be referred to herein simply as beams.

If desired, radios 60 and antennas 62 may support communications using multiple polarizations. For example, radios 60 and antennas 62 may transmit and receive radio-frequency signals with a first polarization (e.g., a left-hand circular polarization (LHCP)) and may transmit and receive radio-frequency signals with a second polarization (e.g., a right-hand circular polarization (RHCP)). Antennas 62 may be able to produce a set of different signal beams at different beam pointing angles (e.g., where each beam overlaps a respective cell on Earth). The set of signal beams may include a first subset of signal beams that convey LHCP signals (e.g., LHCP signal beams) and a second subset of signal beams that convey RHCP signals (e.g., RHCP signal beams). The LHCP and RHCP signal beams may, for example, be produced using respective multiport power amplifiers (MPAs) on satellite 12. This is illustrative and, in general, satellite 12 may produce any desired number of signal beams having any desired polarizations.

FIG. 4 is a flow chart of operations that may be performed by communications system 38 to convey wireless data (e.g., text message data) between UE device 10B and a UE device 10A that moves between being on-grid and off-grid. The operations of FIG. 4 may, for example, be performed after UE device 10A has already registered with and/or subscribed to satellite-based communications offered by CN 20 via NTN 40 (e.g., SMS-via satellite service), after UE device 10A has already registered with and/or subscribed to a corresponding carrier network 22 (e.g., for regular/terrestrial SMS and/or cellular data service), and/or after UE device 10B has already registered and/or subscribed to a corresponding carrier network 22 (e.g., the same carrier network 22 as UE device 10A or a different carrier network 22).

At operation 70, while UE device 10A is on-grid, UE device 10A, CN 20, and IWF 18 (FIG. 1) may provision cryptographic keys and UE handles for use in later routing of text message data (or any other wireless data) between UE device 10A and UE device 10B after UE device 10 has gone off-grid. This may involve the generation and storage of cryptographic keys at UE device 10A, CN 20, and IWF 18. This may also involve generation of UE handles for storage at CN 20. UE device 10A may, for example, generate provisioning data that includes some or all of this information. UE device 10A may transmit the provisioning data to CN 20 (e.g., via terrestrial-based wireless communications equipment 21 of FIG. 1). CN 20 may store the provisioning data until the provisioning data is needed to perform off-grid communications with UE device 10A.

In general, each UE device 10 may be identified by a corresponding globally unique UE identifier UEID. The UE identifier may be, for example, a telephone number, an MSISDN, an email address, an account or profile name, etc. The UE handles may be generated based on the UE identifiers (e.g., using a cryptographic function such as a hashing function or algorithm) to help hide or obfuscate the actual UE identifiers from other nodes of the network (e.g., preserving user privacy). In addition, the UE handles may be significantly smaller and may consume less data than the full UE identifiers. For example, an MSISDN may include 52 bits whereas the UE handle can be as small as between 3 bits and 1 byte. As such, the UE handles may also allow the UE devices to be addressed during communications (e.g., as an intended recipient, as a message source, etc.) using as little data as possible, which reduces message size for transmission through the bandwidth-constrained satellite constellation. UE handles may, for example, be stored on UE device 10A and may be included in provisioning data transmitted to CN 20. Processing may proceed to operation 72 if/when UE device 10A moves off-grid. UE handles are sometimes also referred to herein as opaque handles, obfuscated handles, or UE tags (e.g., MSISDN tags that are in a format different than a standard MSISDN).

At operation 72 (e.g., responsive to UE device 10A moving off-grid), UE device 10A may transmit a request for off-grid service (e.g., a service request or initialization message) to CN 20 via constellation 32.

At operation 74, CN 20 may receive the request for off-grid service. Responsive to receipt of the request for off-grid service, CN 20 and IWF 18 may begin to convey wireless data (e.g., MT text messages and/or MO text messages) between UE device 10B and UE device 10A via constellation 32 and the carrier network(s) 22 associated with UE device 10B. CN 20 and IWF 18 may use some or all of the provisioning data (e.g., cryptographic keys and handles from the provisioning data) to convey the wireless data between UE device 10A and UE device 10B in a secure and resource efficient manner. Processing may proceed to operation 72 if/when UE device 10A moves back on-grid.

At operation 76 (e.g., responsive to UE device 10A moving on-grid), UE device 10A may switch to conveying the wireless data (e.g., MT text messages and/or MO text messages) with UE device 10B via terrestrial-based wireless communications equipment 21 (FIG. 1) instead of via NTN 40. This may involve conveying the wireless data at higher data rates, with greater bandwidth, and with lower latency than conveying the wireless data via constellation 32. If desired, the wireless data conveyed via terrestrial network 34 may include, in some examples, one or more MT or MO text messages that constellation 32 was otherwise unable to deliver to UE device 10A or gateway 14 while UE device 10A was off-grid.

Processing may loop back to operation 70 via path 78. UE device 10A, CN 20, and IWF 18 may re-provision cryptographic keys and/or UE handles every time UE device 10A goes back on-grid and/or periodically (e.g., every 24 hours, every 30 days, every 60 days, every 12 hours, etc.). This may serve to maximize the security of wireless communications over time.

Figure 5:
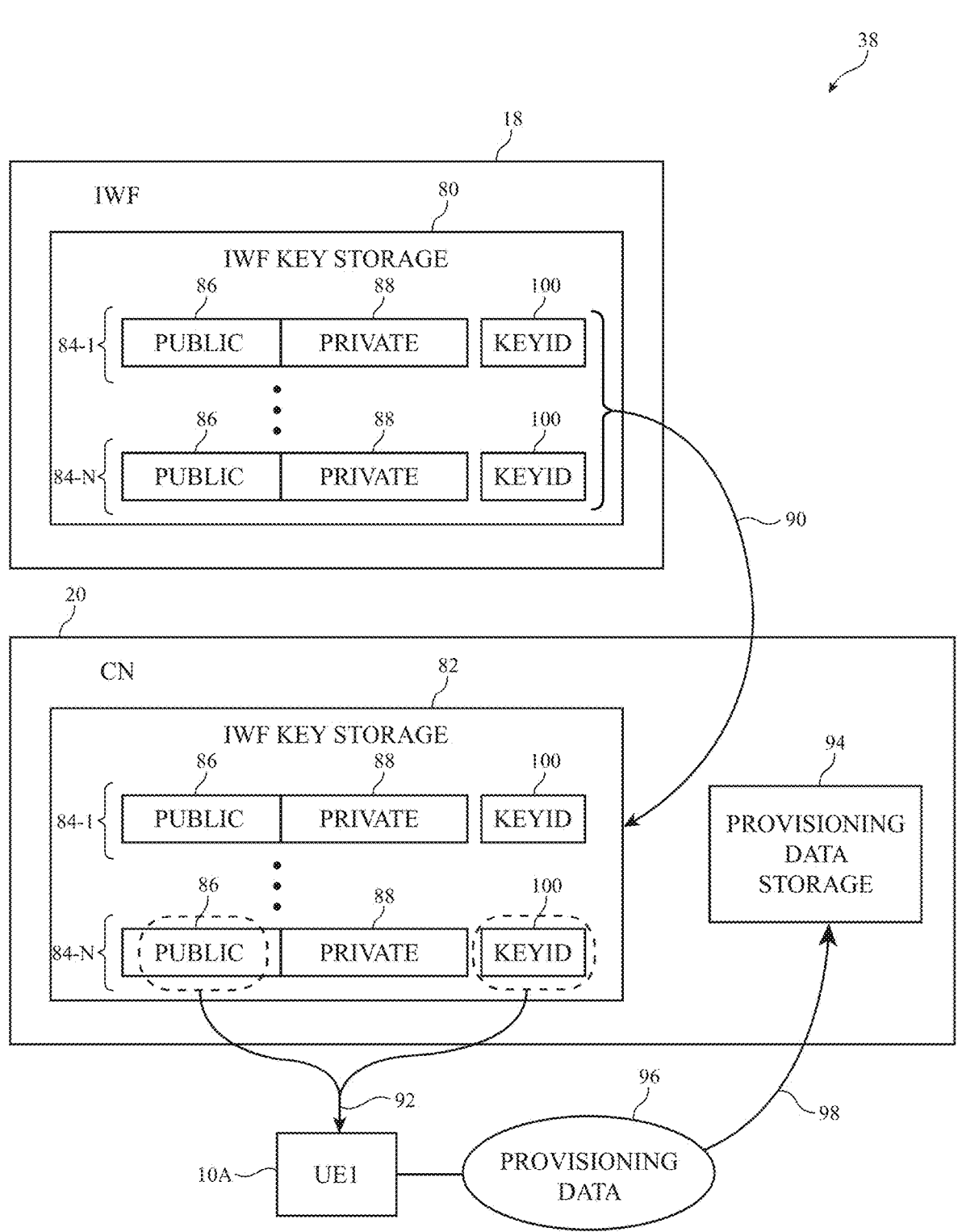
FIG. 5 is an illustrative diagram showing how cryptographic keys and provisioning data may be distributed between an inter-working function (IWF) server, a core network, and a user equipment device while the user equipment device is on-grid in accordance with some embodiments.

FIG. 5 is a diagram showing how information may flow between IWF 18, CN 20, and UE device 10A during provisioning while UE device 10A is on-grid (e.g., while processing operation 70 of FIG. 4). As shown in FIG. 5, IWF 18 may include IWF key storage 80. IWF key storage 80 may store cryptographic keys such as N public-private key pairs 84 (e.g., a first key pair 84-1, an Nth key pair 84-N, etc.). Each key pair 84 includes a corresponding public key 86 and private key 88 associated with a respective one of the N carrier networks 22 in communications system 38 (e.g., each public key 86 is a public key of the corresponding carrier network 22 and each private key 88 is a private key of the corresponding carrier network 22).

Because there are N carrier networks 22 in terrestrial network 34 (FIG. 1), IWF key storage 80 may store at least N key pairs 84. Key pairs 84 are sometimes referred to herein as IWF key pairs 84, carrier-specific key pairs 84, carrier key pairs 84, IWF keys 84, carrier-specific IWF keys 84, or carrier keys 84. Public key 86 is sometimes referred to herein as IWF public key 86. Private key 88 is sometimes referred to herein as IWF private key 88. Each key pair 84 may be used to secure communications with/via the associated carrier network 22. Each key pair 84 may be identified by a corresponding key identifier (KEYID) 100. Key identifier 100 may be, for example, a verified certificate for the corresponding key pair 84 (e.g., verifying the authenticity and/or currentness of the key pair).

IWF 18 may periodically generate (e.g., calculate, compute, fetch, receive, identify, etc.) and store fresh (updated) key pairs 84 for each of the N carrier networks 22 every predetermined time period (e.g., every 24 hours). Refreshing key pairs 84 may help to maximize the security of wireless communications using carrier networks 22 over time. IWF 18 may distribute its stored key pairs 84 and corresponding key identifiers 100 to CN 20, as shown by arrow 90 (e.g., whenever IWF 18 generates and stores fresh key pairs 84 in IWF key storage 80). CN 20 may store the received key pairs 84 in its own IWF key storage 82.

While UE device 10A is on-grid, UE device 10A may fetch, from CN 20 (via the terrestrial network), the IWF public key 86 and the key identifier 100 of the key pair 84 for its associated carrier network 20. In the example of FIG. 5, UE device 10A performs cellular communications using the carrier network 22-N associated with key pair 84-N. As such, CN 20 may transmit the IWF public key 86 and key identifier 100 for key pair 84-N to UE device 10, as shown by arrow 92. UE device 10A may store IWF public key 86 and key identifier 100 for subsequent processing. Key identifier 100 may, for example, include a certificate on the day of provisioning of key pair 84-N.

While UE device 10A is on-grid, UE device 10A may also generate provisioning data 96. UE device 10A may transmit provisioning data 96 to CN 20 via the terrestrial network), as shown by arrow 98 (e.g., in one or more provisioning data messages). CN 20 may store the provisioning data 96 received from UE device 10A in provisioning data storage 94. CN 20 may also store provisioning data 96 received from other UE devices 10 (e.g., UE devices registered with CN 20) in provisioning data storage 94.

Provisioning data 96 may include information that is used by CN 20 to perform subsequent data routing between UE device 10A and UE device 10B via constellation 32 and IWF 18 when UE device 10A is off-grid. By distributing IWF public key 86 and key identifier 100 to UE device 10A and distributing provisioning data 96 to CN 20 while UE device 10A is on-grid, IWF public key 86, key identifier 100, and provisioning data 96 need not be conveyed between UE device 10A and CN 20 after UE device 10A moves off-grid. This serves to minimize the amount of data transmitted over the bandwidth-constrained constellation 32 and helps to minimize the amount of time before UE device 10A can begin successfully transmitting and receiving text messages after UE device 10A has moved off grid. Put differently, by provisioning keys prior to UE device 10A moving off-grid, UE device 10A is able to perform secure communications while off-grid with minimal latency and with minimal data overhead (e.g., saving more data bandwidth through constellation 32 for MO or MT message data payloads).

Figure 6:
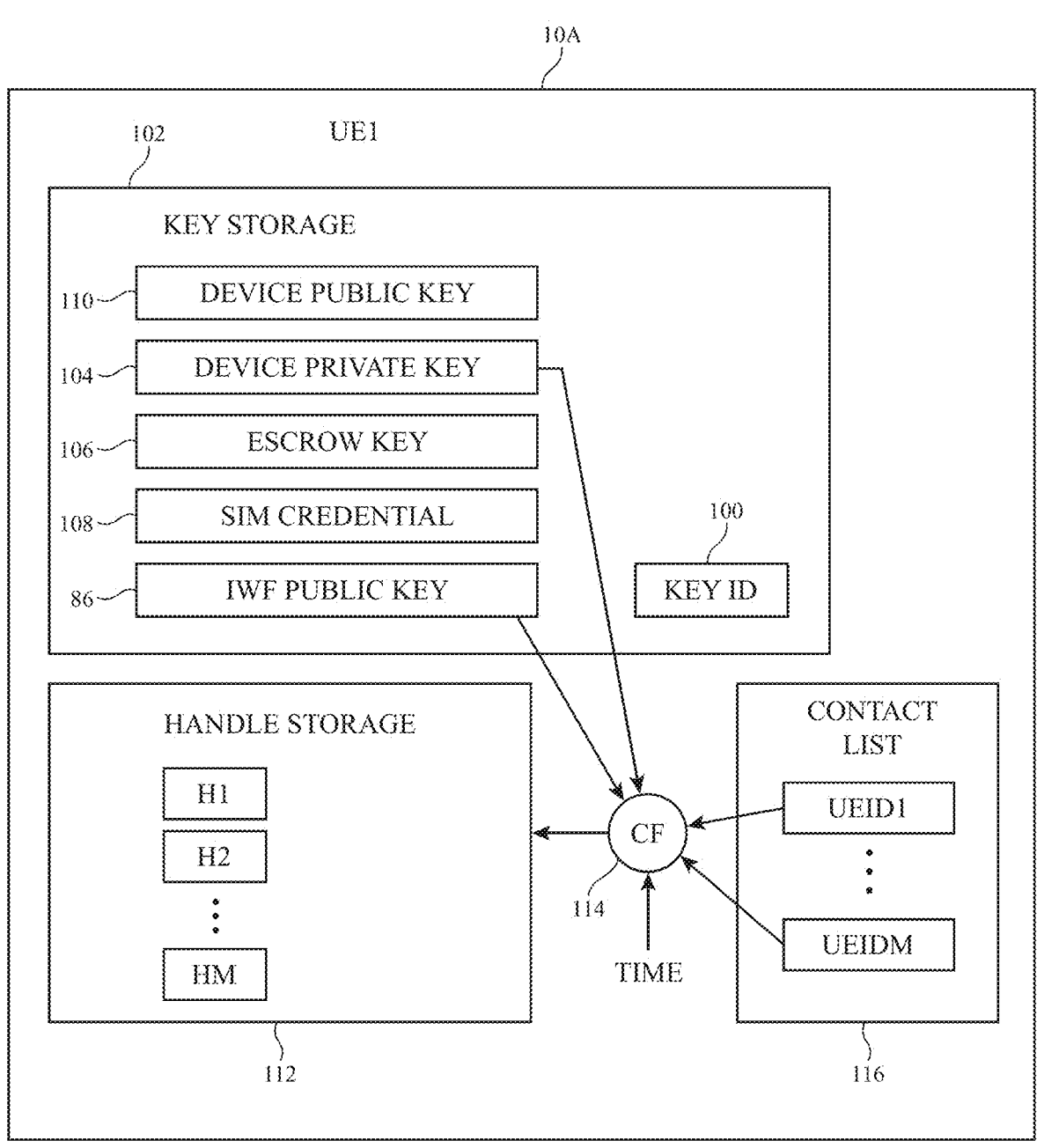
FIG. 6 is a diagram showing how an illustrative user equipment device may store cryptographic keys and generate user equipment handles in accordance with some embodiments.

FIG. 6 is a diagram showing how UE device 10A may store and utilize cryptographic keys for conveying wireless data. As shown in FIG. 6, UE device 10A may include key storage 102, handle storage 112, and a contact list 116 (e.g., on storage circuitry 46 of FIG. 3). While UE device 10A is on-grid, UE device 10A may generate its own public-private key pair (sometimes referred to herein as a UE device key or a device key pair), including a device public key 110 and a device private key 104 (e.g., keys unique to UE device 10A). UE device 10A may also generate an escrow key 106 for use in encrypting device public key 110. Escrow key 106 is sometimes also referred to herein as release key 106. UE device 10A may store device public key 110, device private key 104, and escrow key 106 in key storage 102.

UE device 10A may also store, in key storage 102, the IWF public key 86 and key identifier 100 received from CN 20 upon key provisioning (e.g., from the key pair 84-N associated with its carrier network 22-N in the example of FIG. 5). In addition, UE device 10A may store a SIM credential 108 associated with its SIM 53 (FIG. 2) in key storage 102. UE device 10A may transmit SIM credential 108 to its carrier network 22-N to authenticate UE device 10A to the carrier network (e.g., to allow the carrier network to verify that UE device 10A is subscribed to the carrier network prior to providing cellular service to UE device 10A). SIM credential 108 may include some or all of the information stored on SIM 53 and/or other information associated with SIM 53.

Contact list 116 may be a list of all contacts of UE device 10A or a subset of contacts of UE device 10. The subset of contacts may be, for example, a list of trusted or close contacts or any other desired list of contacts that the user of UE device 10A wishes to allow to communicate with UE device 10A via constellation 32. Contact list 116 may be generated, updated, and/or maintained by one or more software applications running on UE device 10A (e.g., the operating system of UE device 10A, a messaging application, a contacts application, etc.). Contact list 116 may include M contacts, each having an associated UE identifier UEID stored in the contact list (e.g., a first UE identifier UEID1 for a first contact of UE device 10A, an Mth UE identifier UEIDM for an Mth contact of UE device 10A, etc.). The UE identifier may uniquely identify at least one UE device owned, operated, maintained, and/or used by the corresponding contact. UE identifiers UEID may be email addresses, account names, usernames, telephone numbers, MSIDSNs, and/or any other desired identifiers that uniquely identify one or more UE devices of each contact in contact list 116.

UE device 10A may generate a respective UE handle H for each contact in contact list 116 using a cryptographic function such as cryptographic function (CF) 114 (e.g., a hashing function or algorithm that produces a hash-based message authentication code (HMAC), etc.). Cryptographic function 114 may convert each UE identifier UEID in contact list 116 into a different respective UE handle H based on device private key 104, IWF public key 86, and the UE identifier UEID (e.g., cryptographic function 114 may receive the UE identifier UEID, the IWF public key, and the device private key as inputs and may apply a hash or other cryptographic algorithm to the UE identifier using the IWF public key and the device private key, producing the corresponding UE handle H). For example, cryptographic function 114 may generate UE handle H1 for UE identifier UEID1 based on UE identifier UEID1, IWF public key 86, and device private key 104, may generate UE handle HM for UE identifier UEIDM based on UE identifier UEIDM, IWF public key 86, and device private key 104, etc. UE device 10A may store the generated UE handles H in handle storage 112.

Each UE handle H is smaller (e.g., fewer bits or bytes) than the corresponding UE identifier UEID. Each UE handle H may also serve as an anonymous identifier for the corresponding contact in contact list 116 that can be used to convey wireless data without revealing the actual UE identifiers UEID of contact list 116 to other nodes of the network (e.g., to CN 20, IWF 18, etc.). To further enhance security over time, cryptographic function 114 itself may be a function of the current time and may periodically change (e.g., every 24 hours, every time UE device 10A goes off-grid, etc.). UE device 10A may re-generate (update) UE handles H and may store the updated UE handles H in handle storage 112 every time cryptographic function 114 changes (e.g., every 24 hours, every time UE device 10A goes off-grid, etc.). As such, the UE handles H stored in handle storage 112 will change over time even when the UE identifiers UEID in contact list 116 remain the same.

Figure 7:
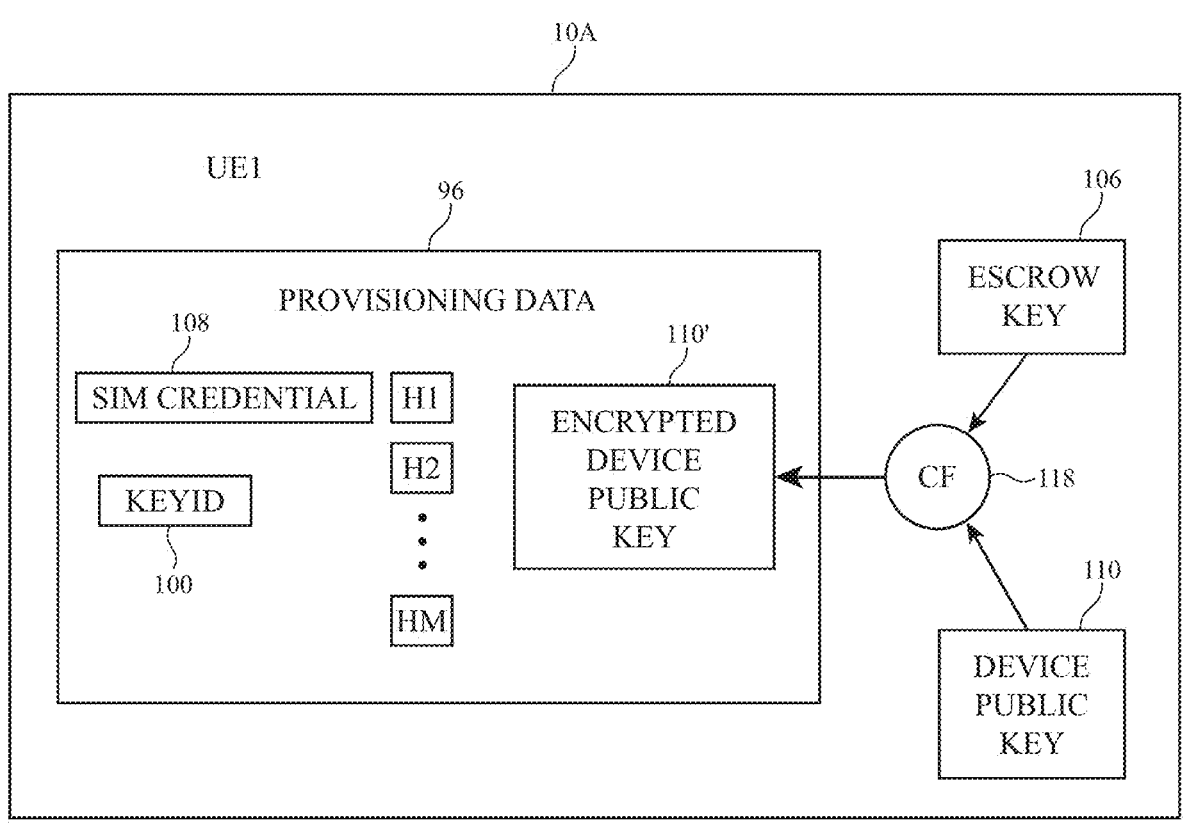
FIG. 7 is a diagram showing how an illustrative user equipment device may generate provisioning data that is distributed to a core network while the user equipment device is on-grid in accordance with some embodiments.

FIG. 7 is a diagram showing how UE device 10A may generate provisioning data 96 while on-grid (e.g., for transmission to CN 20 as shown in FIG. 5). As shown in FIG. 7, UE device 10A may include SIM credential 108 from key storage 102 (FIG. 6) in provisioning data 96. UE device 10A may also include the key identifier 100 for its stored IWF public key 86 (FIG. 6) in provisioning data 96. UE device 10A may further include the UE handles H1, H2, . . . , HM from handle storage 112 (FIG. 6) in provisioning data 96 (e.g., a respective UE handle H for each contact on the contact list 116 of UE device 10A).

To further enhance security, rather than including device public key 110 as plaintext in provisioning data 96, UE device 10 may include an encrypted version of its device public key 110 such as encrypted device public key 110' in provisioning data 96. UE device 10A may generate encrypted device public key 110' using a cryptographic function such as cryptographic function (CF) 118. Cryptographic function 118 may, if desired, be different than the cryptographic function 114 used to generate UE handles H.

Cryptographic function 118 may encrypt device public key 110 using the escrow key 106 stored on key storage 102, generating encrypted device public key 110'. Put differently, cryptographic function 118 may receive escrow key 106 and device public key 110 as inputs and may apply a hash or other cryptographic algorithm to device public key 110 using escrow key 106, which produces encrypted device public key 110' (e.g., as ciphertext). Cryptographic functions 114 and 118 may be implemented using hardware (e.g., digital encryption logic or circuitry) and/or software on UE device 10 (e.g., one or more processors in processing circuitry 48 of FIG. 2 may perform the operations of cryptographic functions 114 and 118). Once assembled, UE device 10A may transmit provisioning data 96 to CN 20 for storage until UE device 10A moves off-grid.

Figure 8:
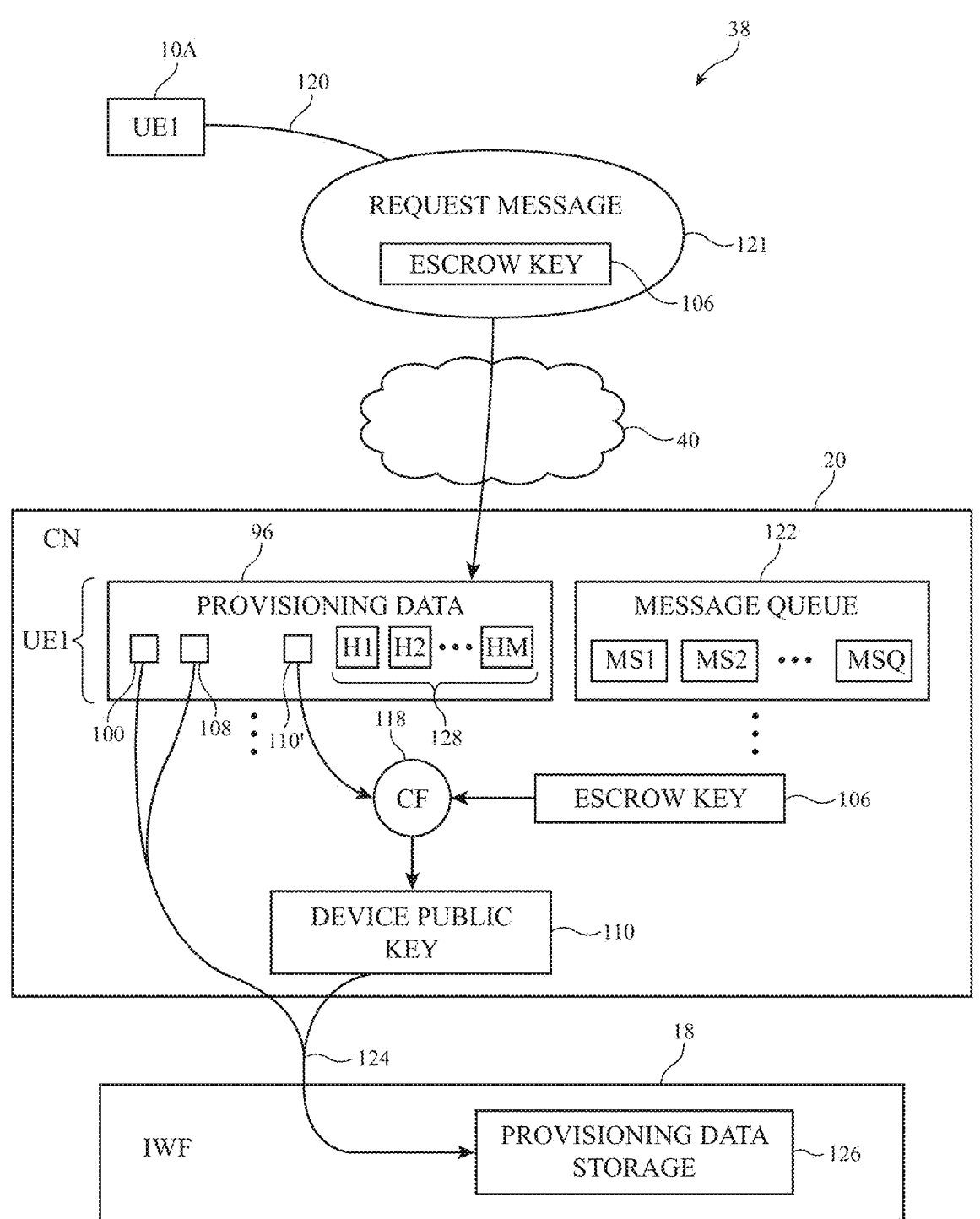
FIG. 8 is an illustrative diagram showing how an escrow key and provisioning data may be distributed between a user equipment device, a core network, and an IWF server while the user equipment device is off-grid in accordance with some embodiments.

FIG. 8 is a diagram showing how communications system 38 may begin to convey wireless data between UE devices 10A and 10B via constellation 32, IWF 18, and CN 20 once UE device 10A has gone off-grid. As shown in FIG. 8, when UE device 10A is off-grid and the user of UE device 10A wishes to convey wireless data (e.g., MT and/or MO text messages) with UE device 10B via constellation 32, the user may provide a user input that triggers UE device 10A to transmit a service request message 121 to a satellite 12 in NTN 40 (e.g., while processing operation 72 of FIG. 4). Constellation 32 (FIG. 1) may forward service request message 121 (sometimes also referred to herein as request message 121 or initialization message 121) to a gateway 14 in NTN 40 and the gateway may forward service request message 121 to CN 20, as shown by arrow 120. UE device 10A may release escrow key 106 from its key storage 102 (FIG. 6) and may include escrow key 106 in request message 121.

As shown in FIG. 8, CN 20 stores provisioning data 96 (e.g., in provisioning data storage 94 of FIG. 5) and a corresponding message queue 122 for each UE device registered with the CN. Message queue 122 stores a set of incoming messages MS (e.g., MT text messages) transmitted by other UE devices 10 that are addressed for receipt by UE device 10A but that have not yet been delivered to UE device 10A over NTN 40 or the terrestrial network. Message queue 122 may store incoming messages MS in a corresponding message order and may transmit incoming messages MS to UE device 10A according to the message order.

There may be an integer number Q of messages MS stored in message queue 122. If desired, CN 20 may include, in MT messages forwarded to UE device 10A via NTN 40, information identifying the number Q of messages MS in message queue 122. This may serve to inform the user of UE device 10A of how many messages the CN has remaining to deliver to UE device 10A and may, if desired, allow the UE device to prompt its user to confirm whether the user wishes to consume additional satellite bandwidth before CN 20 delivers the remaining messages to UE device 10A.

The UE handles H1, H2, . . . , HM in provisioning data 96 are sometimes referred to collectively herein as the allow list 128 for UE device 10A (UE1). Allow list 128 may include UE handles H for each contact in contact list 116 of FIG. 6 (e.g., for each UE device 10 that UE device 10A wishes to allow to communicate with UE device 10 via constellation 32 while UE device 10A is off-grid). CN 20 may screen incoming messages (e.g., MT text messages) destined for UE device 10A from other UE devices 10 against allow list 128 to determine whether to consume satellite bandwidth to forward the incoming messages to UE device 10A. If an incoming message is transmitted by a UE device 10 having a UE handle H included in allow list 128, CN 20 may forward the incoming message to UE device 10A over NTN 40. If an incoming message is transmitted by a UE device 10 having a UE handle H that is not included in allow list 128, CN 20 may add the incoming message to message queue 122 for transmission to UE device 10A after UE device 10A has returned on-grid.

Upon or responsive to receipt of service request message 121, CN 20 may transmit some of the provisioning data 96 for UE device 10A to IWF 18 for use in conveying wireless data between UE device 10A and UE device 10B (e.g., while performing operation 74 of FIG. 4). For example, CN 20 may transmit the key identifier 100 (e.g., identifying the version of IWF public key 86 stored on UE device 10A) and the SIM credential 108 (e.g., identifying the particular carrier network 22 that UE device 10A is subscribed to) from provisioning data 96 to IWF 18, as shown by arrow 124.

CN 20 may also recover the unencrypted device public key 110 of UE device 10A (e.g., while performing operation 74 of FIG. 4). For example, CN 20 may generate device public key 110 by decrypting the encrypted device public key 110' in provisioning data 96 using cryptographic function 118 and using the escrow key 106 received in service request message 121 (e.g., reversing the encryption performed by cryptographic function 118 on UE device 10A of FIG. 7). CN 20 may then transmit the unencrypted device public key 110 to IWF 18, as shown by arrow 124.

IWF 18 may store the SIM credential 108, key identifier 100, and device public key 110 received from CN 20 in its own provisioning data storage 126. IWF 18 may use the SIM credential 108, key identifier 100, and device public key 110 stored in provisioning data storage 126 to route wireless data (e.g., MO and/or MT text messages) between UE device 10A and UE device 10B via constellation 32, CN 20, and one or more carrier networks 22 (FIG. 1) (e.g., while performing operation 74 of FIG. 4).

FIG. 9 is a flow chart of illustrative operations that may be performed by UE device 10A, CN 20, and IWF 18 to provision keys and UE handles while UE device 10A is on-grid. The operations of FIG. 9 may be performed while processing operation 70 of FIG. 4, for example.

At operation 130, IWF 18 may generate key pairs 84 and key identifiers 100 for storage on IWF key storage 80 (FIG. 5). IWF 18 may generate a respective key pair 84 for each of the N carrier networks 22 of terrestrial network 34 (FIG. 1). IWF 18 may continue to periodically re-generate, update, or refresh key pairs 84 every predetermined time period (e.g., operation 130 may be repeated every 24 hours, every 30 hours, every 60 hours, ever 12 hours, etc.). IWF 18 may continue to refresh and store key pairs 84 concurrent with the remaining operations of FIGS. 9 and 4.

At operation 132, IWF 18 may transmit each of its N generated key pairs 84 to CN 20 for storage on IWF key storage 82 (FIG. 5). If desired, IWF 18 may transmit each of the N key pairs 84 to CN 20 every time IWF 18 refreshes the key pairs (e.g., operation 132 may be repeated each time updated key pairs are stored on IWF 18).

At operation 134, CN 20 may distribute, to UE device 10A, the IWF public key 86 and key identifier 100 associated with the carrier network 22 of UE device 10A (e.g., as shown by arrow 92 of FIG. 5). CN 20 may transmit IWF public key 86 and key identifier 100 to UE device 10A over the terrestrial network. UE device 10A may fetch IWF public key 86 and key identifier 100 from CN 20 if desired (e.g., a content delivery network (CDN) of CN 20 may transmit IWF public key 86 and key identifier 100 to UE device 10A responsive to receipt of a key request from UE device 10A). UE device 10A may fetch IWF public key 86 and key identifier 100 periodically (e.g., every 12 hours, every 24 hours, every 30 hours, every 60 hours, etc.), whenever UE device 10A first moves on-grid from being off-grid, whenever refreshed key pairs 84 are stored on CN 20, in response to a user input or application call, and/or in response to any desired trigger condition.

At operation 136, UE device 10A may store the IWF public key 86 and key identifier 100 received from CN 20 (e.g., in key storage 102 of FIG. 6). UE device 10A may also generate (e.g., obtain, compute, calculate, receive, fetch, etc.) device public key 110, device private key 104, and escrow key 106, which are then stored on key storage 102.

At operation 138, UE device 10 may generate and/or update M UE handles H using cryptographic function 114, device private key 104, and IWF public key 86 of FIG. 6 (e.g., a respective UE handle H for each of the M UE identifiers UEID in its contact list 116). UE device 10 may store UE handles H on handle storage 112 (FIG. 6). The UE handles H stored at handle storage 112 may collectively form an allow list 128 (FIG. 8) for satellite communications with UE device 10A.

At operation 140, UE device 10A may generate encrypted device public key 110' using escrow key 106, device public key 110, and cryptographic function 118 (FIG. 7).

At operation 142, UE device 10A may generate provisioning data 96 (FIGS. 5, 7, and 8) that includes at least SIM credential 108, key identifier 100, the M UE handles H in allow list 128, and encrypted device public key 110'.

At operation 144, CN 20 may store provisioning data 96 (FIG. 8) in provisioning data storage 94 (FIG. 5) for later use when UE device 10A has gone off-grid. Operations 134-144 may be repeated whenever UE device 10A returns on-grid from being off-grid, whenever the IWF key pairs are refreshed, periodically (e.g., every 12 hours, every 24 hours, every 30 hours, every 60 hours, etc.), and/or in response to any desired trigger condition.

FIG. 10 is a flow chart of operations involved in conveying wireless data (e.g., MO and/or MT text messages) between UE device 10A and UE device 10B via constellation 32, CN 20, IWF 18, and one or more carrier networks 22 once UE device 10A has gone off-grid. The operations of FIG. 10 may, for example, be performed while processing operations 72 and 74 of FIG. 4 (e.g., after the provisioning operations of FIG. 9 and after UE device 10A has gone off-grid).

At operation 146, UE device 10 may transmit service request message 121 (FIG. 8) to CN 20 via constellation 32. UE device 10 may include its escrow key 106 (FIGS. 6 and 8) in service request message 121.

At operation 148, CN 20 may recover (unwrap) device public key 110 using the escrow key 106 from the received service request message 121 and using the encrypted device public key 110' in the provisioning data 96 stored for UE device 10A (FIG. 8). CN 20 may, for example, input the encrypted device public key 110' from its stored provisioning data 96 and escrow key 106 to cryptographic function 118 (FIG. 8), which unencrypts encrypted device public key 110' to produce device public key 110.

At operation 150, CN 20 may transmit, to IWF 18, the key identifier 100 and the SIM credential 108 from the provisioning data 96 stored for UE device 10A. CN 20 may also transmit the recovered (unencrypted) device public key 110 to IWF 18. IWF 18 may store key identifier 100, SIM credential 108, and device public key 110.

At operation 152, IWF 18 may use the stored key identifier 100, SIM credential 108, and device public key 110 to route wireless data (e.g., MT and/or MO text messages) between UE device 10A and UE device 10B via constellation 32, CN 20, and one or more carrier networks 22. The messages may be conveyed between UE device 10A and IWF 18 (through constellation 32) using a first (e.g., non-SMS) format and/or protocol and may be conveyed between IWF 18 and UE device 10 (through one or more carrier networks 22) using a second (e.g., SMS) format and/or protocol.

IWF 18 may encrypt MT messages transmitted to UE device 10A based on the device public key 110 received from CN 20 (e.g., IWF 18 may use device public key 110 or a symmetric key derived from the device public key to encrypt MT messages transmitted to UE device 10A, establishing end-to-end encrypted between IWF 18 and UE device 10A along arrow 31 of FIG. 1). UE device 10A may decrypt the MT messages transmitted by IWF 18 based on its stored device private key 104 (e.g., UE device 10A may use device private key 104 or a symmetric key derived from the device private key to decrypt the MT messages encrypted by IWF 18, reversing the end-to-end encryption).

Conversely, UE device 10A may encrypt MO messages transmitted to IWF 18 based on its stored IWF public key (e.g., UE device 10A may encrypt the MO messages using its stored IWF public key 86 or a symmetric key derived from the IWF public key, establishing end-to-end encryption between UE device 10A and IWF 18 along arrow 31 of FIG.

1). IWF 18 may use the key identifier 100 received from CN 20 to identify which IWF private key 88 (FIG. 5) to use to decrypt the MO messages received from UE device 10A. IWF 18 may decrypt the MO messages received from UE device 10A based on the identified IWF private key (e.g., IWF 18 may decrypt the MO messages using the identified IWF private key or a symmetric key derived from the identified IWF private key, reversing the end-to-end encryption). Use of key identifier 100 to identify the correct IWF private key may, for example, allow IWF 18 to successfully decrypt the MO messages in situations where IWF 18 has refreshed its key pairs 84 after UE device 10A has moved off-grid or last fetched its IWF public key (e.g., situations where UE device 10A has not been on-grid recently enough to have received the latest IWF public key 86 for its carrier network 22).

To further enhance security, the end-to-end encryption of MO/MT messages between UE device 10A and IWF 18 as described herein may involve the generation and use of additional keys (e.g., symmetric keys of a symmetric key pair) that are derived from device private key 104, IWF public key 86, IWF private key 88, and/or device public key 110. The derived keys may then be used to encrypt and decrypt the MO/MT messages at UE device 10A and IWF 18. The derived keys may be symmetric keys if desired. IWF 18 and UE device 10A may, for example, derive symmetric keys from device private key 104, IWF public key 86, IWF private key 88, and/or device public key 110 and may use the derived symmetric keys to perform the end-to-end encryption/decryption described herein. Encryption using the symmetric keys may output encrypted data (ciphertext) that is not larger than the corresponding unencrypted data (plain text), helping to conserve bandwidth over constellation 32. If desired, IWF 18 and UE device 10A may implement a ratcheting or ratchet counter scheme in performing the end-to-end encryption described herein. Ratcheting uses a counter to generate a new (fresh) symmetric key for each message that is transmitted (e.g., ensuring that each message is encrypted with its own respective symmetric key).

Figure 11:
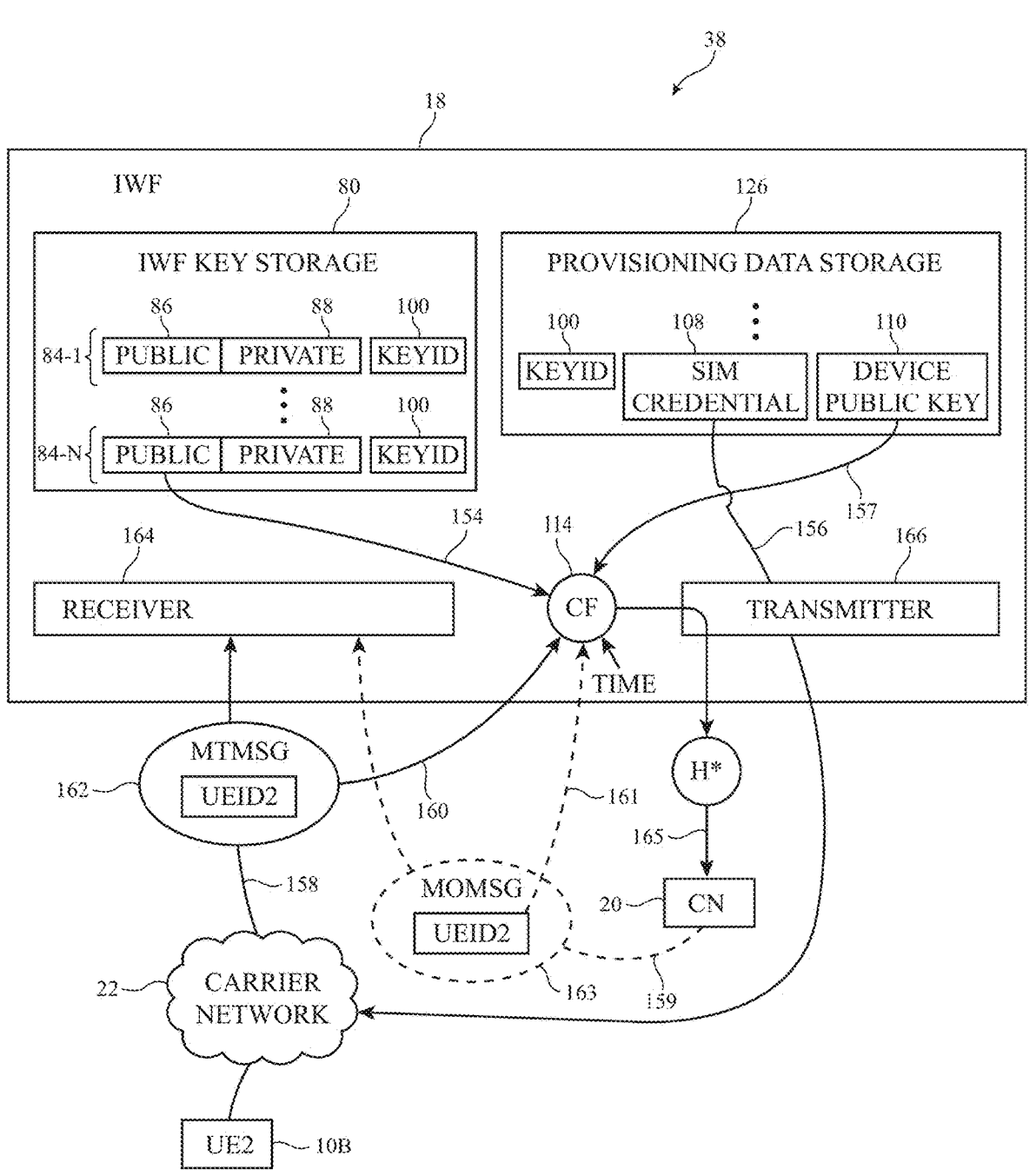
FIG. 11 is a diagram showing how an illustrative IWF server may use provisioning data from a user equipment device to route data while the user equipment device is off-grid in accordance with some embodiments.

FIG. 11 is a diagram showing an example of how IWF 18 may use information from its provisioning data storage 126 to convey MO and MT messages for UE device 10A (e.g., after UE device 10A has gone off-grid and while processing operation 152 of FIG. 10). Consider a first example in which UE device 10B transmits an MT message for receipt by UE device 10A.

As shown in FIG. 11, UE device 10B may transmit MT message 162 to IWF 18 via one or more carrier networks 22, as shown by arrow 158. MT message 162 may include or identify the UEID of UE device 10B (UEID2) (e.g., in a source or transmitter address header field of MT message 162). IWF 18 may receive MT message 162 at receiver 164 (e.g., a wired or wireless communications receiver).

IWF 18 may convert the UEID2 of UE device 10B into a corresponding UE handle H*. For example, as shown by arrow 160, IWF 18 may provide UEID2 as an input to cryptographic function 114. IWF 18 may also input the corresponding IWF public key 86 from IWF key storage 80 to cryptographic function 114, as shown by arrow 154. IWF 18 may further input the device public key 110 for UE device 10A (e.g., from provisioning data storage 126) to cryptographic function 114, as shown by arrow 157. Cryptographic function 114 may generate UE handle H* based on IWF public key 86, device public key 110, and UE identifier UEID2.

IWF 18 may also convert MT message 162 into the format/protocol associated with communications between CN 20 and UE device 10A. IWF 18 may compress and encrypt MT message 162 (e.g., using end-to-end encryption between IWF 18 and UE device 10A). IWF 18 may replace the UE identifier UEID2 in MT message 162 with UE handle H* or may otherwise include UE handle H* in an unencrypted portion of MT message 162. This may serve to shield CN 20 from UE identifier UEID2, helping to hide the true identity of UE device 10B from CN 20 (e.g., preserving user privacy for UE device 10B). UE handle H* may also consume less data in MT message 162 than UE identifier UEID2.

IWF 18 may include a transmitter 166 (e.g., a wired or wireless transmitter). Transmitter 166 may transmit the compressed and encrypted MT message 162 with UE handle H* to CN 20, as shown by arrow 165 (e.g., without transmitting an unencrypted UE identifier UEID2 to CN 20). CN 20 may use UE handle H* to enforce the contact policy of allow list 128 for communications with UE deice 10A via constellation 32.

For example, CN 20 may compare UE handle H* to the stored UE handles H in the allow list 128 for UE device 10A (FIG. 8). If/when UE handle H* matches one of the UE handles H in allow list 128, this is indicative of UE device 10A allowing satellite-based communications with the user of UE device 10B, and CN device 20 may proceed to forward MT message 162 to UE device 10A via constellation 32. If/when UE handle H* does not match one of the UE handles H in allow list 128, CN device 20 may determine whether UE device 10A has transmitted an MO message to UE device 10B within a predetermined time period (e.g., the past 12 hours, 24 hours, etc.).

If/when UE device 10A has not transmitted an MO message to UE device 10B within the predetermined time period, UE device 10A does not forward MT message 162 to UE device 10A and instead stores MT message 162 in message queue 122 (FIG. 8). On the other hand, if/when UE device 10A transmitted an MO message to UE device 10B within the predetermined time period, CN 20 may temporarily add UE handle H* to allow list 128 and may keep UE handle H* on allow list 128 for the predetermined time period. Alternatively, CN 20 may add UE handle H* to allow list 128 upon receipt of UE handle H* in an acknowledgement message from IWF in response to a previously transmitted MT message to UE device 10B.

In this way, CN 20 can help to screen data traffic that is transmitted to UE device 10A given the strict communication constraints of constellation 32, such that only wireless data that the user of UE device 10A is likely to deem important is actually forwarded to UE device 10A over the constellation (e.g., data transmitted by a contact on contact list 116 of FIG. 6 or data that is responsive to a recent MT message already transmitted by UE device 10A). This may serve to minimize the amount of data and bandwidth consumed by UE device 10A in communicating via constellation 32, which can maximize the likelihood that UE device 10A will successfully receive and transmit all desired messages while off-grid.

Consider a second example in which UE device 10A transmits an MO message 163 for receipt by UE device 10B. In this example, IWF 18 may transmit the SIM credential 108 for UE device 10A to carrier network 22 (as shown by arrow 156) to verify access by UE device 10A to carrier network 22. CN 20 may receive MO message 163 from NTN 40 (FIG. 1) and may forward MO message 163 to receiver 164, as shown by arrow 159.

MO message 163 may include or identify the UE identifier UEID2 of UE device 10B. UE identifier UEID2 may, if desired, be shielded from CN 20 via the end-to-end encryption between UE device 10A and IWF 18 (e.g., preserving privacy of UE device 10B). IWF 18 may decompress and decrypt MO message 163 (e.g., reversing the end-to-end encryption between IWF 18 and UE device 10A). This may also recover UE identifier UEID2. IWF 18 may convert MT message 162 from the format/protocol associated with communications between CN 20 and UE device 10A (e.g., non-SMS) into the format/protocol associated with communications between IWF 18 and UE device 10B via carrier network(s) 22 (e.g., SMS). Transmitter 166 may then transmit MO message 163 to UE device 10B via carrier network(s) 22. If desired, UE device 10A may opt to inform CN 20 of UE identifier UEID2 without encrypting UE identifier UEID2.

If desired, IWF 18 may use cryptographic function 114 to generate the handle H* for UE device 10 based on UE identifier UEID2 (as shown by arrow 161), the corresponding IWF public key 86 (as shown by arrow 154), and device public key 157 (as shown by arrow 157). IWF 18 may use transmitter 166 to transmit handle H* to CN 20 (e.g., in an acknowledgement or response message transmitted by IWF to CN 20 responsive to receipt of MO message 163). CN 20 may compare UE handle H* to its stored allow list 128 for UE device 10A (FIG. 8). If handle H* is not already included in allow list 128, CN 20 may temporarily store UE handle H* in allow list 128 for a predetermined time period (e.g., 12 hours, 24 hours, 30 hours, 60 hours, etc.). In this way, CN 20 will know that UE device 10A has already transmitted an MO message to UE device 10B and can then allow UE device 10B to transmit MT messages to UE device 10A for the predetermined time period.

Figure 12:
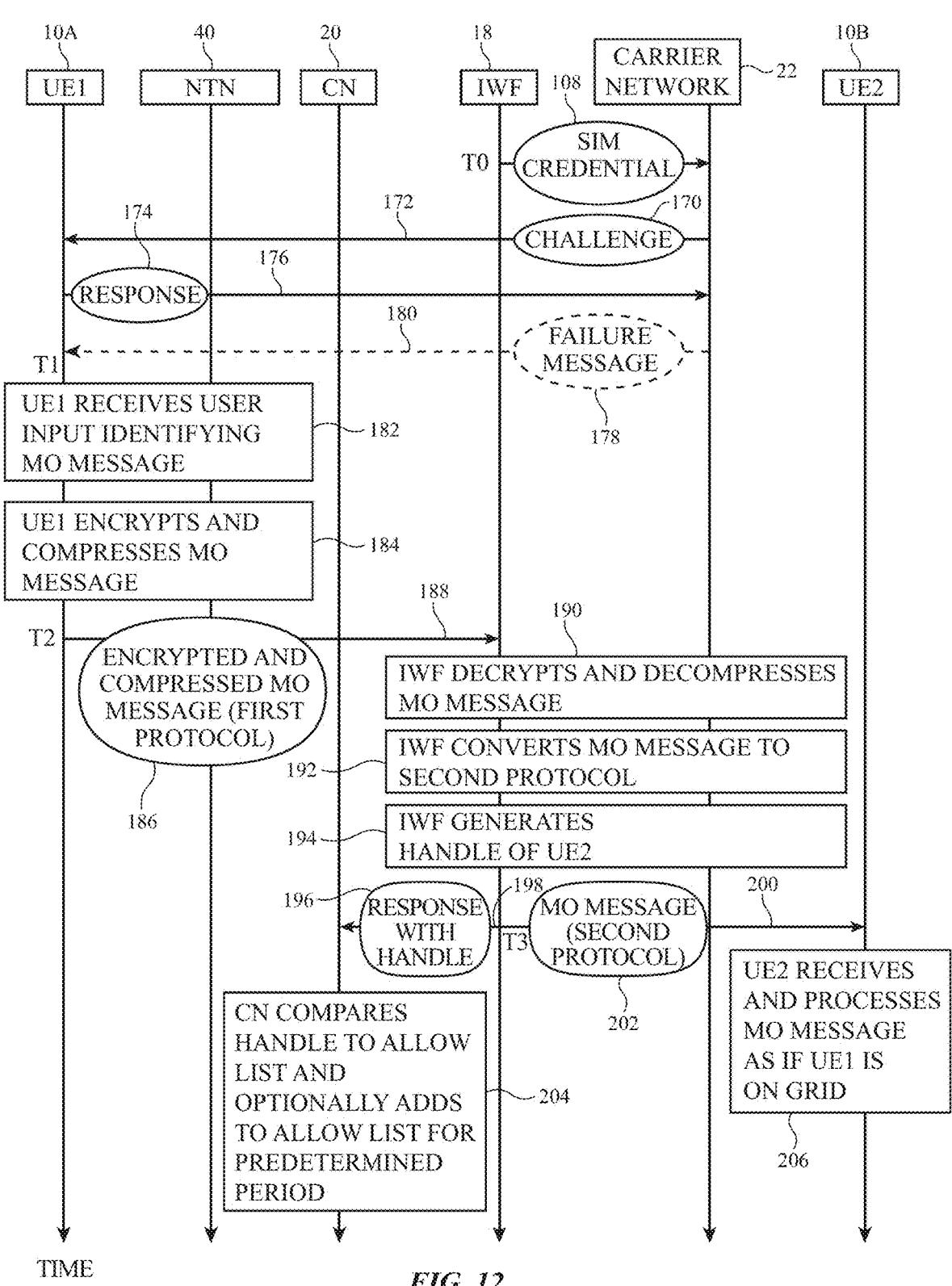
FIG. 12 is a timing diagram of illustrative operations and signals involved in conveying a mobile originated message from a first user equipment device that is off-grid to a second user equipment device in accordance with some embodiments.

FIG. 12 is a timing diagram of illustrative operations and signals involved in using communications system 38 to convey MO messages (e.g., MO message 163 of FIG. 11) from UE device 10A to UE device 10B after UE device 10A has gone off-grid. Time is plotted on the vertical axis of FIG. 12. The operations of FIG. 12 may be performed while processing operation 152 of FIG. 10, for example (e.g., after UE device 10A has gone off-grid and transmitted service request message 121 and after CN 20 has distributed key identifier 100, SIM credential 108, and device public key 110 to IWF 18).

As shown in FIG. 12, at time T0, IWF 18 may transmit the SIM credential 108 of UE device 10A to carrier network 22 (e.g., the carrier network associated with SIM credential 108 and to which UE device 10A is subscribed for cellular service). Responsive to the receipt of SIM credential 108, carrier network 22 may transmit a challenge message 170 to IWF 18, which forwards the challenge to UE1 via CN 20 and NTN 40 (as shown by arrow 172).

UE device 10A may generate a response 174 to challenge 170 and may transmit response 174 to carrier network 22 via NTN 40, CN 20, and IWF 18 (as shown by arrow 176). Carrier network 22 may process response 174 to verify whether UE device 10A is a valid UE device that has access (e.g., an active subscription) to carrier network 22. If/when carrier network 22 is unable to successfully verify response 174, carrier network 22 may transmit a failure message 178 to IWF 18, which forwards the failure message to CN 20, which forwards the failure message to UE device 10A over NTN 40 (as shown by arrow 180). Failure message 178 may serve to inform UE device 10A that UE device 10A is unable to use the network to transmit the MO message to UE device 10B while off-grid. If/when carrier network 22 is able verify response 174, processing may proceed without informing UE device 10A of the successful verification.

At time T1, UE device 10A may receive a user input identifying an MO message (e.g., an MO text message) to be transmitted to UE device 10B (operation 182). UE device 10A may receive the user input via a touch screen display, microphone, keyboard, hand gesture, and/or any other desired user input device. The user input may be received and processed using a messaging software application running on UE device 10A, for example.

At operation 184, UE device 10A may generate an encrypted and compressed MO message 186 (e.g., MO message 163 of FIG. 11) by encrypting and compressing the MO message (e.g., using end-to-end encryption between UE device 10A and IWF 18). UE device 10A may generate encrypted and compressed MO message 186 using a first format/protocol associated with communications over NTN 40 (e.g., non-SMS).

At time T2, UE device 10A may transmit encrypted and compressed MO message 186 to NTN 40, which forwards the message to CN 20, which forwards the message to IWF 18 (as shown by arrow 188).

At operation 190, IWF 18 may decrypt and decompress the encrypted and compressed MO message 186 (e.g., reversing the end-to-end encryption between UE device 10A and IWF 18).

At operation 192, IWF 18 may convert the MO message into a second format/protocol associated with communications over carrier network 22 (e.g., SMS), forming MO message 202.

At operation 194, IWF 18 may use cryptographic function 114 to generate the UE handle H* for UE device 10B, based on the UE identifier UEID2 for UE device 10B included in the decrypted and decompressed MO message (e.g., as shown by arrows 161, 154, 157, and 162 in FIG. 11).

IWF 18 may generate a response (acknowledgement) message 196 to the encrypted and compressed MO message 186 received by IWF 18 from CN 20. Response message 196 may include handle H*. IWF 18 may transmit response message 196 to CN 20 (as shown by arrow 198). IWF 18 may also transmit MO message 202 to carrier network 22, which forwards MO message 202 to UE device 10B (as shown by arrow 200).

At operation 204, CN 20 may compare the UE handle H* in response message 196 to the allow list 128 for UE device 10A. If/when UE handle H* is not already included in allow list 128, CN 20 may add UE handle H* to allow list 128 for a predetermined time period if desired. This may allow UE device 10B to transmit MT messages to UE device 10A via NTN 40 while UE device 10A is off-grid even if UE device 10A did not already have UE device 10B included in its contact list 116 (FIG. 6).

At operation 206, UE device 10B may receive MO message 202 (e.g., from carrier network 22 and optionally through one or more intervening networks that have been omitted from FIG. 12 for the sake of clarity). UE device 10B may process the received MO message 202 (e.g., displaying a corresponding text message payload on a display of UE device 10B, etc.).

When configured in this way, IWF 18 may appear to both carrier network 22 and UE device 10B as indistinguishable from a node or base station of carrier network 22. Similarly, UE device 10A appears, from the perspective of carrier network 22 and UE device 10B, as a UE device that is communicating directly with a base station of carrier network 22 (e.g., via a terrestrial network wireless communication link 23 of FIG. 1). UE device 10B and carrier network 22 may have no way of knowing that UE device 10A is actually off-grid or that messages routed between UE devices 10A and 10B are actually conveyed through space and constellation 32. At the same time, IWF 18, CN 20, and the encryption schemes described herein may help to shield the identity of UE device 10A, the identity of UE device 10B, and the contents of the messages conveyed between UE devices 10A and 10B from as many network entities as possible (e.g., maximizing user privacy) despite the inclusion of both NTN 40 and carrier network 22 within communications system 38.

Figure 13:
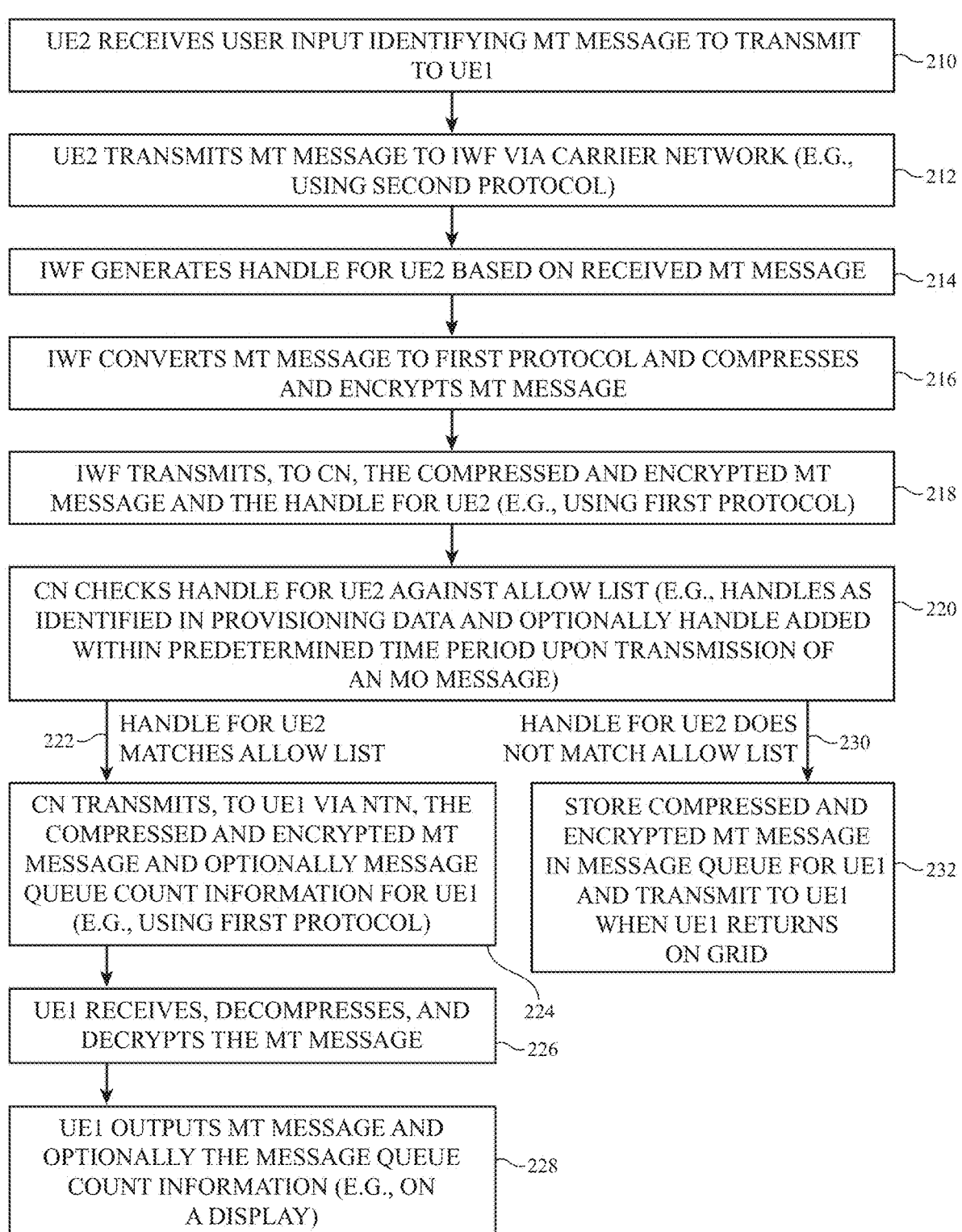
FIG. 13 is a flow chart of illustrative operations involved in conveying a mobile terminated message from a second user equipment device to a first user equipment device that is off-grid in accordance with some embodiments.

FIG. 13 is a flow chart of illustrative operations involved in using communications system 38 to convey MT messages (e.g., MT message 162 of FIG. 11) from UE device 10B to UE device 10A after UE device 10A has gone off-grid. The operations of FIG. 13 may be performed while processing operation 152 of FIG. 10, for example.

At operation 210, UE device 10B may receive a user input identifying an MT message (e.g., an MT text message) to be transmitted to UE device 10A. UE device 10B may receive the user input via a touch screen display, microphone, keyboard, hand gesture, and/or any other desired user input device.

At operation 212, UE device 10B may transmit the MT message to carrier network 22 (e.g., directly or via one or more intervening networks), which forwards the MT message to IWF 18. UE device 10B may transmit the MT message using the second format/protocol (e.g., SMS).

At operation 214, IWF 18 may generate handle H* from the UE identifier UEID2 (FIG. 11) included in the MT message (e.g., using cryptographic function 114, the corresponding IWF public key, and device public key 110 for UE device 10A).

At operation 216, IWF 18 may convert the MT message from the second format/protocol to the first format/protocol (e.g., non-SMS). IWF 18 may encrypt and compress the MT message (e.g., establishing end-to-end encryption between IWF 18 and UE device 10A).

At operation 218, IWF 18 may transmit the compressed and encrypted MT message and the generated UE handle H* for UE device 10B to CN 20 (e.g., using the first format/protocol).

At operation 220, CN 20 may check UE handle H* against the allow list 128 for UE device 10A (e.g., may compare UE handle H* to the UE handles H stored in allow list 128). The handles H stored in allow list 128 may include handles generated by UE device 10A and stored in provisioning data 96 and may, in some situations, include handles generated by IWF 18 and transmitted to CN 20 in response messages 196 (FIG. 12). If/when handle H* matches one of the handles H in allow list 128, processing may proceed to operation 224 over path 222.

At operation 224, CN 20 may forward the compressed and encrypted MT message to UE device 10A over NTN 40. If desired, CN 20 may also transmit status information about the message queue 122 (FIG. 8) for UE device 10. This may include, for example, information identifying the number Q of messages MS in message queue 122 that are still waiting to be transmitted or downloaded to UE device 10A. CN 20 may, for example, include a message counter that identifies and updates Q as the number of messages MS in queue 122 increases over time.

At operation 226, UE device 10A may receive the compressed and encrypted MT message from constellation 32. UE device 10 may decrypt and decompress the MT message.

At operation 228, UE device 10 may output the decrypted and decompressed MT message (e.g., on a display, using a speaker, etc.). If desired, UE device 10 may also output the status information about message queue 122 received from CN 20. This may include, for example, displaying a graphical indicator identifying the number Q of messages MS in message queue 122 that are still waiting to be transmitted or downloaded to UE device 10A, displaying information identifying that the MT message is one part of a series of MT messages, etc. This information may be useful for the user of UE device 10A to use in deciding whether to instruct CN 20 to transmit additional MT messages from the queue given the resource constraints of UE device 10A and constellation 32 and/or in providing the user with context about the MT message, for example.

If/when handle H* does not match any of the handles H in allow list 128, processing may proceed from operation 220 to operation 232 over path 230. At operation 232, CN 20 may store the compressed and encrypted MT message in message queue 122. CN 20 may transmit the compressed and encrypted MT message in message queue 122 to UE device 10A after UE device 10A has returned on-grid (e.g., over the Internet). This may allow the user of UE device 10A to receive the message without consuming valuable resources and bandwidth of constellation 32 and UE device 10A.

If desired, when UE device 10A sends an MO message via constellation 32, UE device 10A may selectively hide or reveal the UE identifier UEID2 of the destination UE device 10B. UE device 10A may reveal UE identifier UEID2 when, for example, UE device 10A wants to trigger UE device 10B to downgrade from using a higher bandwidth messaging service (e.g., a high bandwidth non-SMS format/protocol supported by a messaging application running on UE device 10B) to a lower bandwidth messaging service (e.g., SMS).

When UE device 10A decides to reveal UE identifier UEID2 (e.g., responsive to receipt of a corresponding user input instructing UE device 10A to reveal the UE identifier), UE device 10 may transmit the MO message with a compressed and end-to-end encrypted data payload (e.g., in ciphertext) and an unencrypted portion (e.g., one or more unencrypted fields) that includes UE identifier UEID2 (e.g., in plaintext). The unencrypted portion of the MO message may be secured using an authentication tag (e.g., a message integrity check (MIC) or code computed for the unencrypted field) that is included in the unencrypted portion of the MO message. CN 20 may receive and forward the MO message to IWF 18. IWF 18 may receive the MO message and may check the authentication tag of the UE identifier UEID2 from the unencrypted portion of the MO message to ensure that the UE identifier has not been altered by an unauthorized entity or attacker. IWF 18 may then forward the MO message to UE device 10B via carrier network 22 (e.g., after decompressing and decrypting the encrypted and compressed data payload of the MO message).

Figure 14:
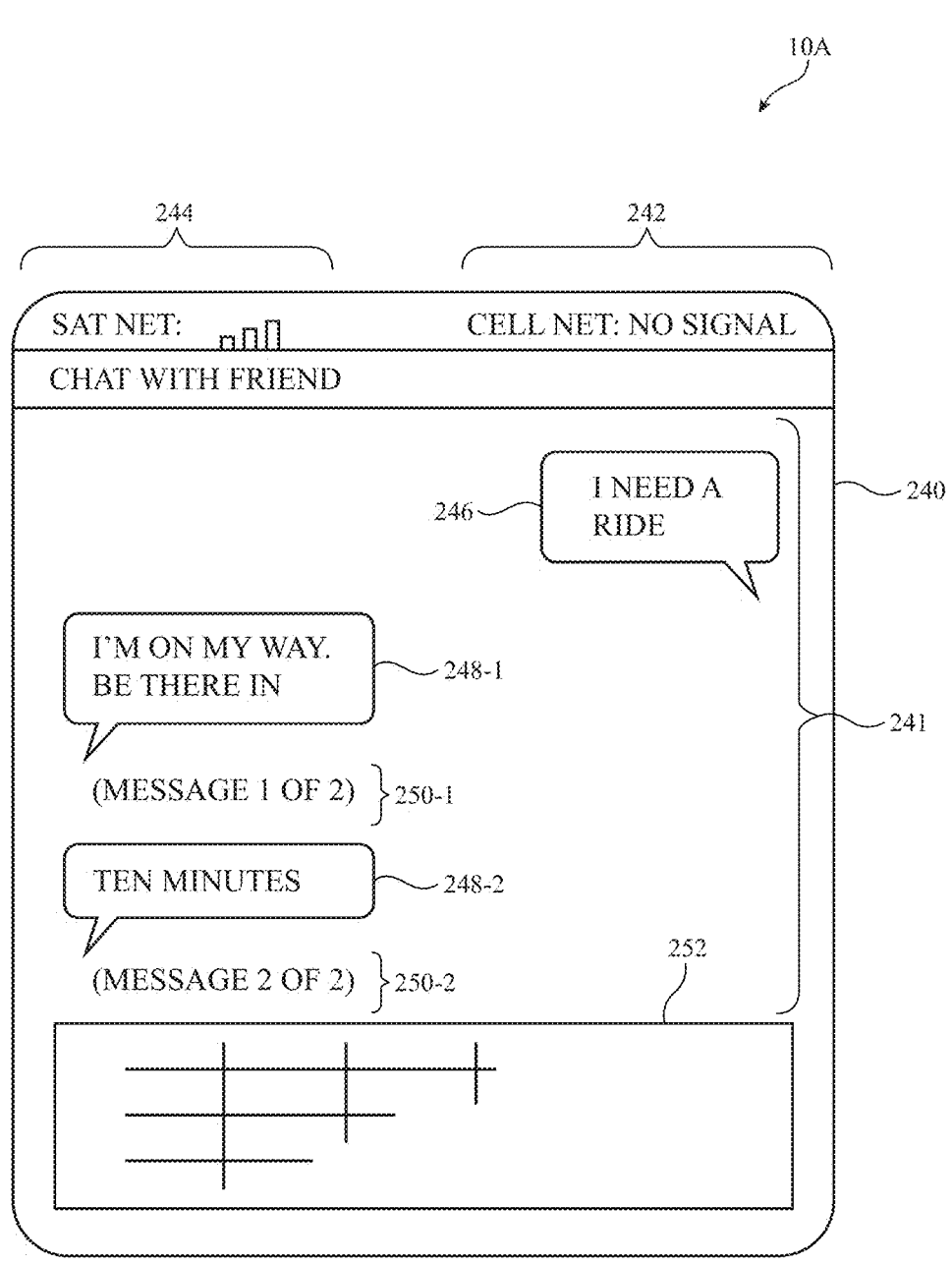
FIG. 14 is a diagram of an illustrative graphical user interface that may be generated by an off-grid user equipment device to display mobile terminated and mobile originated messages in accordance with some embodiments.

FIG. 14 shows an example of a graphical user interface (GUI) that may be displayed on display 51 (FIG. 3) while UE device 10A performs operation 228 of FIG. 13. As shown in FIG. 14, GUI 240 may be displayed on display 51 (e.g., by software such as a text messaging application running on UE device 10A). In the example of FIG. 14, GUI 240 displays messages between UE device 10A and UE device 10B within text field 241 and displays a graphical keyboard 252 that receives user input as keystrokes that type out a text message 246. If desired, keyboard 252 may be omitted from GUI 240 and the user may use a physical keyboard or any other desired user input device or accessory to enter the text.

If desired, GUI 240 may also display a first graphical connectivity indicator 242 associated with the carrier network 22 of UE device 10A and/or a second graphical connectivity indicator 244 associated with NTN 40. Indicator 242 may, for example, identify the signal strength, connectivity level, and/or wireless performance metric data associated with wireless communications using carrier network 22. Indicator 244 may, for example, identify the signal strength, connectivity level, and/or wireless performance metric data associated with wireless communications using constellation 32. As shown in the example of FIG. 14, carrier network 22 is unavailable (e.g., "NO SIGNAL") because UE device 10A is off-grid. However, NTN 40 remains available to UE device 10A while UE device 10A is off-grid.

UE device 10A may transmit text message 246 as an MO message (e.g., as shown in the operations of FIG. 12). GUI 240 may display text message 246. UE device 10A may receive text messages 248 from UE device 10B as MT messages (e.g., using the operations of FIG. 13). GUI 240 may display text messages 248. GUI 240 may also display status indicators 250 based on the received information about the message queue 122 for UE device 10A maintained at CN 20.

In the example of FIG. 14, UE device 10A first receives an MT message 248-1. GUI 240 displays MT message 248-1 along with a first status indicator 250-1 identifying that message queue 122 still contains another MT message 248 for receipt at UE device 10A. UE device 10A then receives a subsequent MT message 248-2 (e.g., from message queue 122 on CN 20). GUI 240 may then display a second status indicator 250-2 identifying that message queue 122 is empty. The example of FIG. 14 is illustrative and non-limiting. In general, GUI 240 may display any desired information in any desired manner.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent." CN 20 may have a communications interface with IWF 18 (e.g., over terrestrial network 34) and may convey wireless data with IWF 18 using or via its communications interface with IWF 18. IWF 18 may have a first communications interface with CN 20 and may have a second communications interface with carrier network 22 (e.g., over terrestrial network 34). IWF 18 may convey wireless data with CN 20 via its first communications interface and may convey wireless data with carrier network 22 via its second communications interface.

One or more elements described herein (e.g., UE devices 10, satellites 12, gateways 14, CN 20, IWF 18, etc.) may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-10 may be performed using software, firmware, and/or hardware (e.g., dedicated circuitry or hardware). Software code for performing these operations may be stored on non-transitory computer readable storage media (e.g., tangible computer readable storage media) stored on one or more of the components of communications system 38 (e.g., storage circuitry 46 of FIG. 2 or similar storage circuitry on satellites 12, gateways 14, CN 20, IWF 18, etc.). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of communications system 38 (e.g., processing circuitry 48 of FIG. 2 or similar processing circuitry on satellites 12, gateways 14, CN 20, IWF 18, etc.). The processing circuitry may include microprocessors, central processing units (CPUs), application-specific integrated circuits with processing circuitry, or other processing circuitry.

For one or more aspects, at least one of the components set forth in one or more of the preceding figures may be configured to perform one or more operations, techniques, processes, or methods as set forth herein. For example, the control circuitry as described above in connection with one or more of the preceding figures may be configured to operate in accordance with one or more of the examples set forth herein. For another example, circuitry associated with a UE, satellite, gateway, core network, base station, network element, etc. as described above in connection with one or more of the preceding figures may be configured to operate in accordance with one or more of the examples set forth herein.

An apparatus (e.g., an electronic user equipment device, a wireless base station, etc.) may be provided that includes means to perform one or more elements of a method described in or related to any of the methods or processes described herein.

One or more non-transitory computer-readable media comprising instructions to cause an electronic device, upon execution of the instructions by one or more processors of the electronic device, to perform one or more elements of any method or process described herein.

An apparatus comprising logic, modules, or circuitry to perform one or more elements of a method described in or related to any of the method or process described herein.

An apparatus comprising: one or more processors and one or more non-transitory computer-readable storage media comprising instructions that, when executed by the one or more processors, cause the one or more processors to perform the method, techniques, or process as described herein.

A signal, datagram, information element, packet, frame, segment, PDU, or message or datagram may be provided as described in or related to any of the examples described herein.

A signal encoded with data, a datagram, IE, packet, frame, segment, PDU, or message may be provided as described in or related to any of the examples described herein.

An electromagnetic signal may be provided carrying computer-readable instructions, wherein execution of the computer-readable instructions by one or more processors is to cause the one or more processors to perform the method, techniques, or process as described in or related to any of the examples described herein.

A computer program comprising instructions, wherein execution of the program by a processing element is to cause the processing element to carry out the method, techniques, or process as described in or related to any of the examples described herein.

A signal in a wireless network as shown and described herein may be provided.

A method of communicating in a wireless network as shown and described herein may be provided.

A system for providing wireless communication as shown and described herein may be provided.

A device for providing wireless communication as shown and described herein may be provided.

For one or more aspects, at least one of the components set forth in one or more of the preceding figures may be configured to perform one or more operations, techniques, processes, or methods as set forth in the example section below.

EXAMPLES

In the following sections, further exemplary aspects are provided.

Example 1 includes a method of operating a user equipment (UE) device, comprising: receiving, using one or more antennas, a first cryptographic key from a core network via terrestrial-based wireless equipment; encrypting, using one or more processors, a second cryptographic key using a third cryptographic key; transmitting, using the one or more antennas, provisioning data to the core network via the terrestrial-based wireless equipment for use after the UE device has gone off grid, wherein the provisioning data includes the encrypted second cryptographic key; and transmitting, using the one or more antennas while the UE device is off grid, the third cryptographic key to the core network via a satellite constellation for use by the core network in decrypting the encrypted second cryptographic key in the provisioning data.

Example 2 includes the method of example 1, further comprising: transmitting, using the one or more antennas, a mobile originated (MO) message to the core network via the satellite constellation after transmission of the third cryptographic key to the core network.

Example 3 includes the method of example 2, wherein transmitting the third cryptographic key comprises transmitting the third cryptographic key in a service request message transmitted to the core network via the satellite constellation.

Example 4 includes the method of example 2, wherein the first cryptographic key is associated with a cellular telephone network of the UE device.

Example 5 includes the method of example 4, wherein the provisioning data includes: a key identifier associated with the first cryptographic key; and a subscriber identity module (SIM) credential associated with the UE device and the cellular telephone network.

Example 6 includes the method of example 4, wherein the terrestrial-based wireless equipment comprises a base station of the cellular telephone network or an access point of a wireless local area network.

Example 7 includes the method of example 4, wherein the MO message is end-to-end encrypted between the UE device and an inter-working function (IWF) server that is separate from the core network and the cellular telephone network.

Example 8 includes the method of example 7, wherein transmitting the MO message comprises encrypting the MO message based at least on the first cryptographic key.

Example 9 includes the method of example 1, further comprising: receiving, using the one or more antennas, a mobile terminated (MT) message from the core network via the satellite constellation after transmission of the third cryptographic key to the core network.

Example 10 includes the method of example 9, wherein the MT message is end-to-end encrypted between the UE device and an inter-working function (IWF) server, the IWF server is separate from the core network and a cellular telephone network associated with the terrestrial-based wireless equipment, the second cryptographic key belongs to a public-private key pair that includes a fourth cryptographic key, and receiving the MT message comprises decrypting the MT message based at least on the fourth cryptographic key.

Example 11 includes the method of example 9, further comprising: receiving, using the one or more antennas, status information from the core network via the satellite constellation, wherein the status information identifies a status of a message queue maintained at the core network for the UE device; and displaying, using a display, the MT message and the status information.

Example 12 includes the method of example 1, further comprising: generating, using the one or more processors, a list of handles associated with contacts on a contact list maintained at the UE device, wherein the provisioning data includes the list of handles, the contacts are associated with respective UE identifiers, the handles are generated using a cryptographic function based at least on the respective UE identifiers, the handles are smaller than the UE identifiers, and the cryptographic function is periodically updated after a predetermined time period.

Example 13 includes the method of example 12, wherein the respective UE identifiers comprise Mobile Station International Subscriber Directory Numbers associated with the contacts on the contact list.

Example 14 includes the method of example 1, further comprising: transmitting, using the one or more antennas, a mobile originated (MO) message to a recipient UE device via the satellite constellation, the core network, and an inter-working function (IWF) server, wherein the MO message includes a data payload that is end-to-end encrypted between the UE device and the IWF server, the recipient UE device has a corresponding UE identifier, and the MO message includes a handle associated with the UE identifier of the recipient UE device.

Example 15 includes the method of example 14, further comprising: generating, using the one or more processors, the handle based at least on the UE identifier of the recipient device, a cryptographic function, and the first cryptographic key.

Example 16 includes an electronic device comprising: a receiver configured to receive a first cryptographic key from a core network via terrestrial-based wireless equipment; one or more processors configured to generate an encrypted key by encrypting a second cryptographic key using a third cryptographic key; and a transmitter configured to transmit: provisioning data to the core network via the terrestrial-based wireless equipment, wherein the provisioning data includes the encrypted key, and the third cryptographic key to the core network via a satellite constellation.

Example 17 includes the electronic device of example 16, further comprising: a display, wherein the receiver is configured to receive a mobile terminated (MT) text message from the core network via the satellite constellation after transmission of the third cryptographic key to the core network, and the display is configured to display the MT text message.

Example 18 includes the electronic device of example 17, wherein the receiver is configured to receive status information from the core network via the satellite constellation, the status information identifies a status of a message queue maintained at the core network for the electronic device, and the display is configured to display a graphical user interface (GUI) that includes the MT text message and the status information.

Example 19 includes a non-transitory computer-readable storage medium storing one or more programs configured to be executed by one or more processors of an electronic device, the one or more programs comprising instructions for: receiving, while the electronic device is on-grid with a terrestrial-based wireless network, a first cryptographic key from a core network; generating an encrypted key by encrypting a second cryptographic key using a third cryptographic key; transmitting, while the electronic device is on-grid with the terrestrial-based wireless network, the encrypted key to the core network; and transmitting, while the electronic device is off-grid with the terrestrial-based wireless network, the third cryptographic key to the core network via a satellite constellation.

Example 20 includes the non-transitory computer readable storage medium of example 19, the one or more programs further comprising instructions for: transmitting, while the electronic device is on-grid with the terrestrial-based wireless network, a key identifier associated with the first cryptographic key and a subscriber identity module (SIM) credential of the electronic device; and transmitting, while the electronic device is off-grid with the terrestrial-based wireless network, a mobile originated (MO) text message to the core network via the satellite constellation after transmission of the third cryptographic key to the network, wherein the MO message is end-to-end encrypted between the electronic device and an inter-working function (IWF) server based at least on the first cryptographic key; and displaying, on a display, the MO text message.

Example 21 includes a method of operating a server to route messages for a user equipment (UE) device, comprising: transmitting, to the UE device, a first key via a terrestrial network while the first UE device is connected to the terrestrial network; receiving, from the UE device, provisioning data while the first UE device is connected to the terrestrial network, the provisioning data including a second key; receiving, from the UE device, a third key via a satellite constellation; decrypting, using one or more processors, the second key based at least on the third key; and transmitting, to an inter-working function (IWF) server, the decrypted second key.

Example 22 includes the method of example 21, further comprising: transmitting, to the IWF server, a subscriber identity module (SIM) credential associated with the UE device.

Example 23 includes the method of example 22, further comprising: transmitting, to the IWF server, an identifier associated with the first key.

Example 24 includes the method of example 21, wherein the provisioning data includes a list of obfuscated handles for a set of UE devices, the method further comprising:

receiving, from the IWF server, a mobile terminated (MT) message transmitted by an additional UE device.

Example 25 includes the method of example 24, further comprising: receiving, from the IWF server, an obfuscated handle for the additional UE device, the obfuscated handle for the additional UE device being generated by the IWF server based at least on an identifier of the additional UE device and a cryptographic function.

Example 26 includes the method of example 25, further comprising: responsive to the obfuscated handle for the additional UE device matching an obfuscated handle in the list of obfuscated handles, forwarding the MT message to the UE device via the satellite constellation.

Example 27 includes the method of example 26, further comprising: responsive to the obfuscated handle for the additional UE device not matching any obfuscated handle in the list of obfuscated handles, forwarding the MT message to the UE device via terrestrial network after the UE device has reconnected to the terrestrial network.

Example 28 includes the method of example 26, further comprising: receiving a mobile originated (MO) message transmitted by the UE device via the satellite constellation; and forwarding the MO message to the IWF server.

Example 29 includes the method of example 28, further comprising: receiving, from the IWF server, an additional obfuscated handle generated by the IWF server based at least on the MO message; and adding the additional obfuscated handle to the list of obfuscated handles.

Example 30 includes a method of operating a server to route messages for a user equipment (UE) device, comprising: receiving, via a satellite constellation, an encrypted and compressed mobile originated (MO) transmitted by the UE device; forwarding the encrypted and compressed MO message to an inter-working function (IWF) server; receiving, from the IWF server, an acknowledgement to the encrypted and compressed MO message that includes a handle associated with a recipient of the encrypted and compressed MO message; and adding the handle to a list of contacts allowed to transmit mobile terminated (MT) messages to the UE device via the satellite constellation.

Example 31 includes the method of example 30, further comprising: receiving, from the IWF server, an MT message transmitted by the recipient of the encrypted and compressed MO message; and forwarding the MT message to the UE device via the satellite constellation.

Example 32 includes the method of example 31, wherein the one or more servers do not decompress or decrypt the MT message received from the IWF server.

Example 33 includes the method of example 30, further comprising: removing the handle from the list of contacts after a predetermined time period.

Example 34 includes the method of example 33, wherein the predetermined time period comprises 12-60 hours.

Example 35 includes the method of example 30, wherein the handle comprises a hash of an identifier associated with the recipient of the encrypted and compressed MO message.

Example 36 includes the method of example 35, wherein the identifier comprises an email address, a profile name, or a Mobile Station International Subscriber Directory Number (MSISDN) associated with the recipient of the encrypted and compressed MO message.

Example 37 includes a non-transitory computer-readable storage medium storing one or more programs configured to be executed by one or more processors of a server, the one or more programs comprising instructions for: receiving, via a terrestrial network, a set of handles transmitted by the first UE device, the set of handles being associated with a contact list stored on the first UE device; storing the set of handles in an allow list associated with the first UE device; receiving, from an inter-working function (IWF) server, a mobile terminated (MT) message transmitted by a second UE device; receiving, from the IWF server, a handle associated with the second UE device; and forwarding, responsive to the handle matching an entry of the allow list, the MT message to the first UE device via a satellite constellation.

Example 38 includes the non-transitory computer-readable storage medium of example 37, the one or more programs further comprising instructions for: storing, responsive to the handle not matching any entry of the allow list, the MT message in a message queue associated with the first UE device.

Example 39 includes the non-transitory computer-readable storage medium of example 38, the one or more programs further comprising instructions for: transmitting, to the first UE device, at least one message from the message queue via the satellite constellation; and transmitting, to the first UE device, the MT message stored in the message queue via the terrestrial network.

Example 40 includes the non-transitory computer-readable storage medium of example 37, wherein the set of handles comprise hashes of user equipment identifiers in the contact list.

Example 41 includes a method of operating a server to route wireless data via a network comprising a satellite constellation, the method comprising: receiving, via a communications interface with a core network, a first key generated by a first user equipment (UE) device; receiving, via a communications interface with a carrier network, a message transmitted by a second UE device intended for the first UE device, wherein the message comprises an identifier associated with the second UE device; generating, using one or more processors, a handle associated with the second UE device based at least on the first key, the identifier, and a cryptographic function; encrypting, using the one or more processors, the message based at least on a second key; and transmitting, via the communications interface with the core network, the encrypted message and the handle.

Example 42 includes the method of example 41, wherein the handle uniquely identifies the second UE device but is smaller than the identifier.

Example 43 includes the method of example 41, further comprising: transmitting, via the communications interface with the core network, a third key associated with the carrier network, wherein the message is end-to-end encrypted between the server and the first UE device.

Example 44 includes the method of example 43, further comprising: receiving, via the communications interface with the core network, a key identifier that identifies a version of the third key that is stored on the first UE device.

Example 45 includes the method of example 44, further comprising: receiving, via the communications interface with the core network, a subscriber identity module (SIM) credential associated with the first UE device and the carrier network.

Example 46 includes the method of example 45, further comprising: forwarding the SIM credential to the carrier network.

Example 47 includes the method of example 46, further comprising: forwarding, to the first UE device via the core network and the satellite constellation, a challenge transmitted by the carrier network.

Example 48 includes the method of example 47, further comprising: forwarding, to the carrier network, a response to the challenge transmitted by the first UE device via the satellite constellation and the core network.

Example 49 includes the method of example 41, further comprising: receiving, via the satellite constellation of communications satellites and the communications interface with the core network, an additional message transmitted by the first UE device, the additional message comprising the identifier associated with the second UE device.

Example 50 includes the method of example 49, further comprising: converting, using the one or more processors, the additional message from a first format associated with communications via the core network into a second format associated with communications via the carrier network.

Example 51 includes the method of example 50, further comprising: transmitting the converted additional message to the second UE device via the communications interface with the carrier network, wherein the second format comprises a Short Messaging Service (SMS) format.

Example 52 includes the method of example 49, further comprising generating, using one or more processors, an additional handle associated with the second UE device based at least on the first key, the identifier associated with the second UE device, and the cryptographic function; and transmitting, via the communications interface with the core network, an acknowledgement corresponding to the additional message, wherein the acknowledgement comprises the additional handle.

Example 53 includes a method of operating a server to route wireless data via a satellite constellation, the method comprising: receiving, using a communications interface with a core network, an encrypted and compressed mobile originated (MO) message transmitted by a first user equipment (UE) device via the satellite constellation according to a first protocol; decrypting and decompressing the MO message received from the core network; and transmitting, to a second UE device using a communications interface with a carrier network, the decrypted and decompressed MO message according to a second protocol associated with the carrier network.

Example 54 includes the method of example 53, further comprising: transmitting, using the communications interface with the core network, an acknowledgement corresponding the encrypted and compressed MO message, wherein the acknowledgement comprises a handle that uniquely identifies the second UE device.

Example 55 includes the method of example 54, further comprising: generating the handle by inputting, to a cryptographic function, an identifier associated with the second UE device, a public key associated with the first UE device, and a public key associated with the server.

Example 56 includes the method of example 55, wherein the identifier associated with the second UE device comprises an email address, a profile name, or a Mobile Station International Subscriber Directory Number (MSISDN) associated with the second UE device.

Example 57 includes the method of example 55, further comprising: receiving, using the communications interface with the core network, the public key associated with the first UE device.

Example 58 includes the method of example 55, further comprising: receiving, using the communications interface with the core network, a subscriber identity module (SIM) credential associated with the first UE device; forwarding the SIM credential to the carrier network; receiving, using the communications interface with the carrier network, a challenge associated with the SIM credential; and forwarding, to the first UE device via the satellite constellation, the challenge associated with the SIM credential.

Example 59 includes a non-transitory computer-readable storage medium storing one or more programs configured to be executed by one or more processors on a server, the one or more programs comprising instructions for: receiving, over a communications interface with a core network, a cryptographic key generated by a first user equipment (UE) device; receiving, over a communications interface with a carrier network, a message transmitted by a second UE device intended for the first UE device, wherein the message comprises an identifier associated with the second UE device; generating, using one or more processors, a handle associated with the second UE device based at least on the cryptographic key and the identifier; and transmitting the handle over the communications interface with the core network.

Example 60 includes the non-transitory computer readable storage medium of example 59, wherein the handle uniquely identifies the second UE device but is shorter than the identifier, and wherein the one or more programs further comprise instructions for: encrypting, using the one or more processors, the message based at least on an additional key; and transmitting the encrypted message over the communications interface with the core network.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A method of operating a user equipment (UE) device, comprising:
   receiving, using one or more antennas, a first cryptographic key from a core network via terrestrial-based wireless equipment;
   encrypting, using one or more processors, a second cryptographic key using a third cryptographic key;
   transmitting, using the one or more antennas, provisioning data to the core network via the terrestrial-based wireless equipment for use after the UE device has gone off grid, wherein the provisioning data includes the encrypted second cryptographic key; and
   transmitting, using the one or more antennas while the UE device is off grid, the third cryptographic key to the core network via a satellite constellation for use by the core network in decrypting the encrypted second cryptographic key in the provisioning data.

2. The method of claim 1, further comprising:
   transmitting, using the one or more antennas, a mobile originated (MO) message to the core network via the satellite constellation after transmission of the third cryptographic key to the core network.

3. The method of claim 2, wherein transmitting the third cryptographic key comprises transmitting the third cryptographic key in a service request message transmitted to the core network via the satellite constellation.

4. The method of claim 2, wherein the first cryptographic key is associated with a cellular telephone network of the UE device.

5. The method of claim 4, wherein the provisioning data includes:
   a key identifier associated with the first cryptographic key; and
   a subscriber identity module (SIM) credential associated with the UE device and the cellular telephone network.

6. The method of claim 4, wherein the terrestrial-based wireless equipment comprises a base station of the cellular telephone network or an access point of a wireless local area network.

7. The method of claim 4, wherein the MO message is end-to-end encrypted between the UE device and an inter-working function (IWF) server that is separate from the core network and the cellular telephone network.

8. The method of claim 7, wherein transmitting the MO message comprises encrypting the MO message based at least on the first cryptographic key.

9. The method of claim 1, further comprising:
   receiving, using the one or more antennas, a mobile terminated (MT) message from the core network via the satellite constellation after transmission of the third cryptographic key to the core network.

10. The method of claim 9, wherein the MT message is end-to-end encrypted between the UE device and an inter-working function (IWF) server, the IWF server is separate from the core network and a cellular telephone network associated with the terrestrial-based wireless equipment, the second cryptographic key belongs to a public-private key pair that includes a fourth cryptographic key, and receiving the MT message comprises decrypting the MT message based at least on the fourth cryptographic key.

11. The method of claim 9, further comprising:
   receiving, using the one or more antennas, status information from the core network via the satellite constellation, wherein the status information identifies a status of a message queue maintained at the core network for the UE device; and
   displaying, using a display, the MT message and the status information.

12. The method of claim 1, further comprising:
   generating, using the one or more processors, a list of handles associated with contacts on a contact list maintained at the UE device, wherein the provisioning data includes the list of handles, the contacts are associated with respective UE identifiers, the handles are generated using a cryptographic function based at least on the respective UE identifiers, the handles are smaller than the UE identifiers, and the cryptographic function is periodically updated after a predetermined time period.

13. The method of claim 12, wherein the respective UE identifiers comprise Mobile Station International Subscriber Directory Numbers associated with the contacts on the contact list.

14. The method of claim 1, further comprising:
   transmitting, using the one or more antennas, a mobile originated (MO) message to a recipient UE device via the satellite constellation, the core network, and an inter-working function (IWF) server, wherein the MO message includes a data payload that is end-to-end encrypted between the UE device and the IWF server, the recipient UE device has a corresponding UE identifier, and the MO message includes a handle associated with the UE identifier of the recipient UE device.

15. The method of claim 14, further comprising:
   generating, using the one or more processors, the handle based at least on the UE identifier of the recipient device, a cryptographic function, and the first cryptographic key.

16. An electronic device comprising:

a receiver configured to receive a first cryptographic key from a core network via terrestrial-based wireless equipment;

one or more processors configured to generate an encrypted key by encrypting a second cryptographic key using a third cryptographic key; and a transmitter configured to transmit:

provisioning data to the core network via the terrestrial-based wireless equipment, wherein the provisioning data includes the encrypted key, and the third cryptographic key to the core network via a satellite constellation.

17. The electronic device of claim 16, further comprising:

a display, wherein the receiver is configured to receive a mobile terminated (MT) text message from the core network via the satellite constellation after transmission of the third cryptographic key to the core network, and the display is configured to display the MT text message.

18. The electronic device of claim 17, wherein the receiver is configured to receive status information from the core network via the satellite constellation, the status information identifies a status of a message queue maintained at the core network for the electronic device, and the display is configured to display a graphical user interface (GUI) that includes the MT text message and the status information.

19. A non-transitory computer-readable storage medium storing one or more programs configured to be executed by one or more processors of an electronic device, the one or more programs comprising instructions for:

receiving, while the electronic device is on-grid with a terrestrial-based wireless network, a first cryptographic key from a core network;

generating an encrypted key by encrypting a second cryptographic key using a third cryptographic key;

transmitting, while the electronic device is on-grid with the terrestrial-based wireless network, the encrypted key to the core network; and transmitting, while the electronic device is off-grid with the terrestrial-based wireless network, the third cryptographic key to the core network via a satellite constellation.

20. The non-transitory computer readable storage medium of claim 19, the one or more programs further comprising instructions for:

transmitting, while the electronic device is on-grid with the terrestrial-based wireless network, a key identifier associated with the first cryptographic key and a subscriber identity module (SIM) credential of the electronic device; and transmitting, while the electronic device is off-grid with the terrestrial-based wireless network, a mobile originated (MO) text message to the core network via the satellite constellation after transmission of the third cryptographic key to the network, wherein the MO message is end-to-end encrypted between the electronic device and an inter-working function (IWF) server based at least on the first cryptographic key; and displaying, on a display, the MO text message.

* * * * *